US012794800B2

(12) United States Patent
Sajassi et al.

(10) Patent No.: US 12,794,800 B2
(45) Date of Patent: Nov. 10, 2026

(54) ADAPTIVE OPTIMIZATION OF EQUAL COST MULTI-PATH GROUPS IN A MULTI-HOMING NETWORK

(71) Applicant: Cisco Technology, Inc., San Jose, CA (US)

(72) Inventors: Ali Sajassi, San Jose, CA (US); Lukas Krattiger, Houston, TX (US); Krishnaswamy Ananthamurthy, Austin, TX (US); Mei Zhang, Research Triangle Park, NC (US)

( * ) Notice: Subject to any disclaimer, the term of this patent is extended or adjusted under 35 U.S.C. 154(b) by 121 days.

(21) Appl. No.: 18/929,433

(22) Filed: Oct. 28, 2024

(65) Prior Publication Data

US 2026/0121971 A1 Apr. 30, 2026

(51) Int. Cl.

| | |
|---|---|
| ***H04L 12/703*** | (2013.01) |
| ***H04L 12/707*** | (2013.01) |
| ***H04L 12/715*** | (2013.01) |
| ***H04L 12/803*** | (2013.01) |
| ***H04L 45/02*** | (2022.01) |
| ***H04L 45/24*** | (2022.01) |
| ***H04L 45/28*** | (2022.01) |

(52) U.S. Cl.

CPC .............. *H04L 45/24* (2013.01); *H04L 45/02* (2013.01); *H04L 45/28* (2013.01)

(58) Field of Classification Search

CPC ......... H04L 45/28; H04L 45/02; H04L 45/24; H04L 12/703; H04L 12/715; H04L 12/803; H04L 12/707

USPC .......................................................... 709/238

See application file for complete search history.

(56) References Cited

U.S. PATENT DOCUMENTS

2016/0134528 A1* 5/2016 Lin .................... H04L 12/4641 709/238
2020/0092200 A1 3/2020 Velayudhan et al.
2021/0234727 A1 7/2021 Ranpise et al.
2021/0352007 A1 11/2021 Boutros et al.
2022/0247669 A1 8/2022 Burdet et al.
2023/0216774 A1 7/2023 Suryanarayana et al.

* cited by examiner

*Primary Examiner* — Jude Jean Gilles

(74) *Attorney, Agent, or Firm* — Rutan & Tucker, LLP; Ravi Mohan; Marc A. McClain

(57) ABSTRACT

Existing Equal Cost Multi-path (ECMP) grouping strategies in a multi-homing network have scalability issues due to limited hardware resources. To address this, devices, systems, methods, and processes for adaptive optimization of ECMP groups are described herein. An optimization logic, coupled to a plurality of network devices, receives a set of route advertisements of the plurality of network devices and allocates a shared ECMP group, including two or more network devices of the plurality of network devices, for at least two ESs based on the set of route advertisements. A next hop list is generated in which the at least two ESs point to the shared ECMP group. The optimization logic may update the next hop list based on link failures or route withdrawal advertisements associated with the two or more network devices included in the shared ECMP group. The ES may be removed from pointing to the shared ECMP group.

26 Claims, 9 Drawing Sheets

400

| | 404 | 406 | 408 | 410 | 412 | 414 |
|---|---|---|---|---|---|---|
| | TOTAL PE | DUAL-HOMING-PE SET | EHTERNET-SEGMENT PER PE | TOTAL LINK PER ETHERNET SEGMENT | ECMP GROUPS NON-OPTIMIZED | ECMP GROUPS OPTIMIZED |
| 402A | 2 | 1 | 200 | 2 | 200 | 1 |
| 402B | 50 | 25 | 200 | 2 | 5,000 | 25 |
| 402C | 100 | 50 | 200 | 2 | 10,000 | 50 |
| 402D | 500 | 250 | 200 | 2 | 50,000 | 250 |

FIG. 4

ADAPTIVE OPTIMIZATION OF EQUAL COST MULTI-PATH GROUPS IN A MULTI-HOMING NETWORK

The present disclosure relates to communication networks. More particularly, the present disclosure relates to adaptive optimization of equal cost multi-path groups in a multi-homing network.

BACKGROUND

Multi-homing is a network architecture strategy where a device or network connects to multiple upstream networks or service providers, enhancing reliability, load balancing, redundancy, and fault tolerance. In Ethernet Virtual Private Network (EVPN)-based multi-homing, endpoints connect to multiple Provider Edge (PE) devices through Link Aggregation Groups (LAGs), known as Ethernet Segments(ES), which are identified by unique Ethernet-Segment Identifiers (ESI). These ESIs are advertised in various EVPN Route Types to distribute Media Access Control (MAC) and Internet Protocol (IP) routing information and facilitate next-hop resolution, allowing remote PEs to create Equal Cost Multi-Path (ECMP) groups for overlay multipathing across the network.

However, using ECMP groups in EVPN-based multi-homing introduces various challenges such as resource limitations, increased management complexity, and scalability issues. For example, static multi-homing configuration requires overlay attributes to be distributed within the underlay control plane, complicating network configuration. Additionally, hardware limitations, such as certain Application Specific Integrated Circuit (ASIC's) support for only 256 ECMP groups for MAC multipathing, restrict the number of manageable ESs, limiting network scalability. As ECMP group numbers near the ASIC's limit, network performance may degrade, creating bottlenecks and reducing efficiency. These limitations make the network's scalability and performance heavily dependent on the underlying hardware, leading to potentially costly and disruptive upgrades.

SUMMARY OF THE DISCLOSURE

Systems and methods for facilitating adaptive optimization of equal cost multi-path groups in a multi-homing network in accordance with embodiments of the disclosure are described herein.

In many embodiments, a device comprises a processor, a network interface controller configured to provide access to a network, and a memory communicatively coupled to the processor. The network comprises a plurality of network devices, where each of the plurality of network devices is coupled to a set of Ethernet Segments (ESs). The memory comprises an optimization logic that is configured to receive a set of route advertisements of the plurality of network devices, allocate a shared Equal Cost Multi-Path (ECMP) group, including two or more network devices of the plurality of network devices, for at least two ESs of the set of ESs based on the set of route advertisements, and generate a next hop list in which the at least two ESs point to the shared ECMP group.

In a number of embodiments, a route advertisement of a network device of the plurality of network devices is configured to advertise an Ethernet Segment Identifier (ESI) of an ES of the set of ESs coupled to the network device.

In a variety of embodiments, the optimization logic is further configured to allocate the shared ECMP group based on an intersection of ESIs of the at least two ESs in route advertisements of the two or more network devices.

In further embodiments, a route advertisement of a network device of the plurality of network devices is configured to advertise an Ethernet Segment Identifier (ESI) and a weight attribute, of an ES of the set of ESs coupled to the network device.

In several embodiments, the optimization logic is further configured to allocate the shared ECMP group based on an intersection of ESIs and weight attributes of the at least two ESs in route advertisements of the two or more network devices.

In numerous embodiments, the weight attribute of the ES is configured to indicate a total link count associated with the ES.

In additional embodiments, the optimization logic is further configured to detect a link failure associated with at least one network device of the two or more network devices, and update the shared ECMP group based on the detected link failure.

In more embodiments, wherein the optimization logic is further configured to receive a route withdrawal advertisement, of a network device of the two or more network devices, for an ES of the at least two ESs, and update the next hop list based on the route withdrawal advertisement.

In various embodiments, the set of route advertisements corresponds to Ethernet Virtual Private Network (EVPN) route advertisements.

In yet more embodiments, the set of route advertisements corresponds to Ethernet Auto-Discovery (EAD) route advertisements.

In still more embodiments, the plurality of network devices corresponds to provider edge (PE) devices coupled to two or more host devices via the set of ESs.

In still yet more embodiments, the two or more host devices are Media Access Control (MAC)-addressable devices.

In many additional embodiments, the device corresponds to a remote provider edge device.

In further additional embodiments, a device comprises a processor, a network interface controller configured to provide access to a network, and a memory communicatively coupled to the processor. The network comprises a plurality of network devices, where each of the plurality of network devices is coupled to a set of Ethernet Segments (ESs). The memory comprises an optimization logic that is configured to receive a set of route advertisements of the plurality of network devices and generate, based on the set of route advertisements, a next hop list in which at least two ESs of the set of ESs point to a shared Equal Cost Multi-Path (ECMP) group. The shared ECMP group includes two or more network devices, of the plurality of network devices, that have the at least two ESs in common. The optimization logic is further configured to receive a route withdrawal advertisement, of a network device of the two or more network devices, for an ES of the at least two ESs, and update the next hop list by removing the ES from pointing to the shared ECMP group.

In numerous additional embodiments, prior to generating the next hop list, the optimization logic is further configured to allocate the shared ECMP group for the at least two ESs based on the set of route advertisements.

In several additional embodiments, the optimization logic is further configured to allocate a new ECMP group for the ES based on the route withdrawal advertisement.

In many further embodiments, the new ECMP group includes a set of network devices that remain after removing the network device from the two or more network devices.

In many more embodiments, the optimization logic is further configured to update the next hop list by causing the ES to point to the new ECMP group.

In still further embodiments, the route withdrawal advertisement is configured to indicate an Ethernet Segment Identifier (ESI) of the ES.

In yet further embodiments, a method comprises receiving a set of route advertisements of a plurality of network devices, where each of the plurality of network devices is coupled to a set of ethernet segments (ESs). The method further comprises allocating a shared Equal Cost Multi-Path (ECMP) group, including two or more network devices of the plurality of network devices, for at least two ESs of the set of ESs based on the set of route advertisements, and generating a next hop list in which the at least two ESs point to the shared ECMP group.

In still additional embodiments, the method further comprises allocating the shared ECMP group based on an intersection of ESIs of the at least two ESs in route advertisements of the two or more network devices.

In some more embodiments, the method further comprises allocating the shared ECMP group based on an intersection of ESIs and weight attributes of the at least two ESs in route advertisements of the two or more network devices.

In yet various embodiments, the method further comprises detecting a link failure associated with at least one network device of the two or more network devices; and updating the shared ECMP group based on the detected link failure.

In still yet further embodiments, the method further comprises receiving a route withdrawal advertisement, of a network device of the two or more network devices, for an ES of the at least two ESs, and updating the next hop list based on the route withdrawal advertisement.

In still yet additional embodiments, a method comprises receiving a set of route advertisements of a plurality of network devices, where each of the plurality of network devices is coupled to a set of Ethernet Segments (ESs). The method further comprises generating, based on the set of route advertisements, a next hop list in which at least two ESs of the set of ESs point to a shared Equal Cost Multi-Path (ECMP) group, where the shared ECMP group includes two or more network devices, of the plurality of network devices, that have the at least two ESs in common. The method further comprises receiving a route withdrawal advertisement, of a network device of the two or more network devices, for an ES of the at least two ESs, and updating the next hop list by removing the ES from pointing to the shared ECMP group.

In several more embodiments, the method further comprises prior to generating the next hop list, allocating the shared ECMP group for the at least two ESs based on the set of route advertisements.

In many embodiments, the method further comprises allocating a new ECMP group for the ES based on the route withdrawal advertisement.

In a number of embodiments, the method further comprises updating the next hop list by causing the ES to point to the new ECMP group.

Other objects, advantages, novel features, and further scope of applicability of the present disclosure will be set forth in part in the detailed description to follow, and in part will become apparent to those skilled in the art upon examination of the following or may be learned by practice of the disclosure. Although the description above contains many specificities, these should not be construed as limiting the scope of the disclosure but as merely providing illustrations of some of the presently preferred embodiments of the disclosure. As such, various other embodiments are possible within its scope. Accordingly, the scope of the disclosure should be determined not by the embodiments illustrated, but by the appended claims and their equivalents.

BRIEF DESCRIPTION OF DRAWINGS

The above, and other, aspects, features, and advantages of several embodiments of the present disclosure will be more apparent from the following description as presented in conjunction with the following several figures of the drawings.

FIG. 4 is an example diagram of a Table highlighting comparative analysis between optimized ECMP group allocation and non-optimized ECMP group allocation in accordance with various embodiments of the disclosure.

Figure 1:
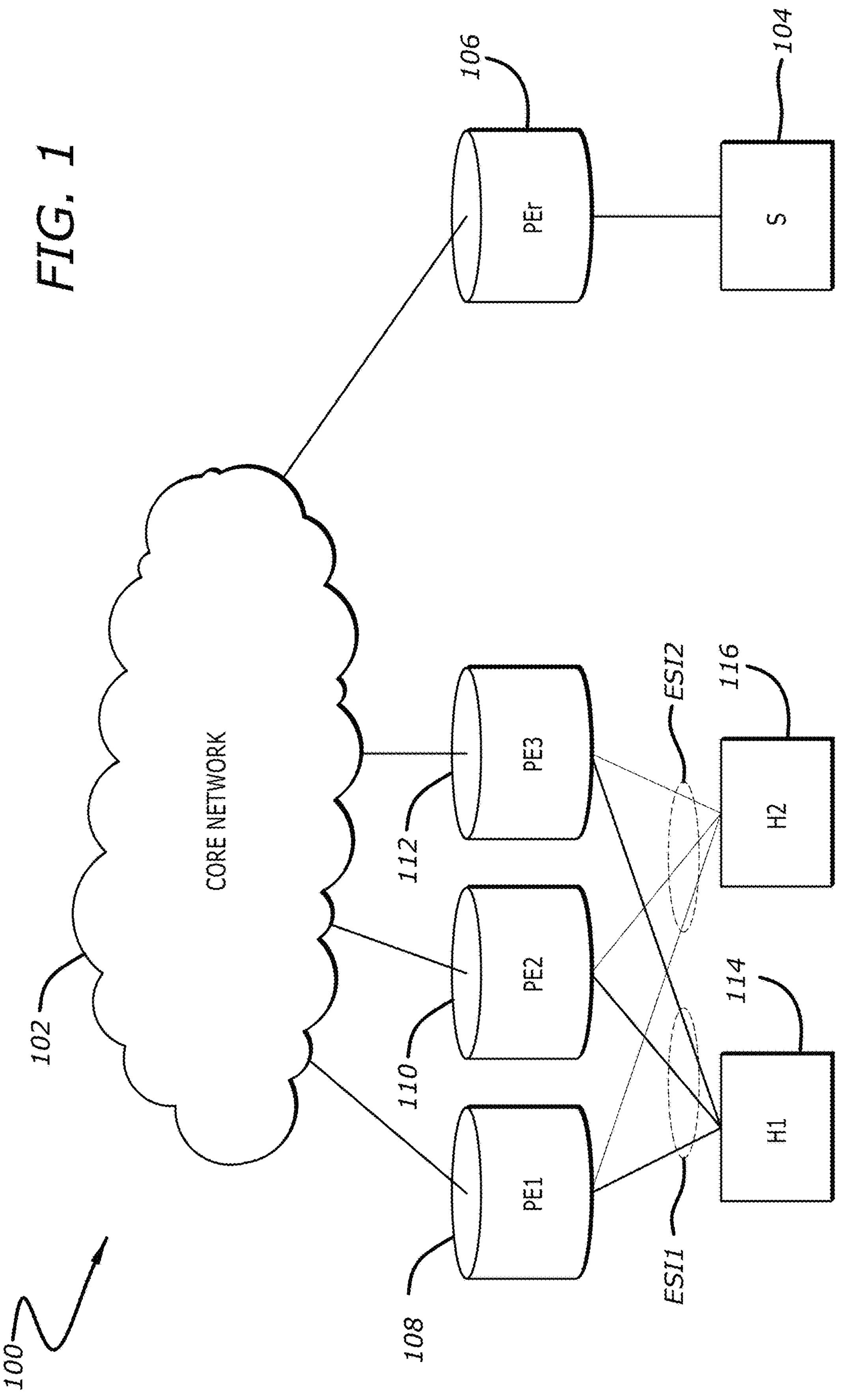
FIG. 1 a schematic block diagram of an example multi-homing network architecture in accordance with various embodiments of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the issues described above, devices and methods are discussed herein to facilitate adaptive optimization of equal cost multi-path groups in a multi-homing network. In multi-homing, a device or a network connects to multiple upstream networks or service providers. In the existing multi-homing architectures, such as Ethernet Virtual Private Network (EVPN) based multi-homing, endpoints or networks are redundantly coupled to multiple Provider Edge (PE) devices ("TX-nodes") using a Link Aggregation Group (LAG), also known as an Ethernet Segment(ES). These Ethernet Segments are identified by unique Ethernet Segment Identifiers (ESI) that are advertised, for example, in EVPN Route-Type 2 (Medium Access Control, "MAC" Internet Protocol, "IP") and EVPN Route-Type 5 (IP Prefix) to distribute MAC and IP routing information, and in EVPN Route-Type 1 (Ethernet Auto-Discovery, "EAD") routes for next-hop resolution and other purposes. Remote PEs ("RX-nodes") utilize these advertisements to enable overlay multipathing, which is represented by creating an Equal Cost Multi-Path (ECMP) group (overlay ECMP) for routes associated with the same ESI and common set of PEs (TX-nodes). In other words, the RX nodes utilize the advertised information to create ECMP groups, allowing it to distribute incoming traffic evenly across all available TX-nodes associated with the same ESI.

Despite the various improvements offered by creating an ECMP group (e.g., overlay ECMP) for routes associated with the same ESI and common set of PEs (TX-nodes), the EVPN multi-homing architecture faces several challenges that may include, for example, resource limitation, complexity in management, potential performance bottlenecks, scalability issues, and hardware dependency. In the current EVPN multi-homing network architecture, if more than two links are utilized in a bundle for multi-homing, multi-homing weight attributes must be distributed in the Interior Gateway Protocol (IGP) for each ES. In other words, overlay attributes need to be communicated within an underlay control plane of the EVPN network architecture, adding complexity to the network configuration. Additionally, if there are more than two anchor PEs, an Anycast address may be assigned for each ES. This results in numerous Anycast IP address assignments, further complicating network management and configuration. This lack of flexibility assumes that a multi-Homing configuration, including PE anchor points, remains static and does not change, limiting the network's adaptability to dynamic changes. Further, these overlay attributes are managed and tracked by using Application Specific Integrated Circuit (ASIC) that have limited resources for ECMP groups. As the number of ECMP groups approaches the ASIC's limit, performance may degrade due to increased processing overhead, leading to potential bottlenecks and reduced network efficiency. This finite number of ECMP groups also restricts the overall scalability of the EVPN-based network, as only a limited number of LAGs can be attached, hindering the ability to scale the network as needed. The network's scalability and performance are heavily dependent on the capabilities of the underlying hardware (ASICs). Upgrading or replacing hardware to overcome limitations can be costly and disruptive.

Therefore, the present disclosure provides a network device (e.g., a remote provider edge, "PE" device, a receiving network node, a receiving device, or the like) that facilitates adaptive optimization of ECMP groups in a multi-homing network. Hereinafter, the network device is referred to as the "remote PE device". In the multi-homing network architecture, each of a plurality of host devices (e.g., servers, computers, or any networked device that requires high availability and reliable connectivity) may connect to multiple network devices (e.g., a plurality of transmitting PE devices) through separate physical or logical links. Thus, each host device may distribute its traffic (e.g., data packets) across the plurality of transmitting PE devices, balancing the load and optimizing the use of network resources. The plurality of transmitting PE devices may include, for example, routers or switches at the edge of a provider network (e.g., a multi-homing EVPN network), responsible for connecting to the host devices. The plurality of transmitting PE devices may handle the ingress and egress of data packets to and from the host devices and other parts of the network.

Further, each host device may be coupled to the plurality of transmitting PE devices through separate links, forming an ES identified by a unique ESI. In particular, in the case where a host device is multi-homed to the plurality of transmitting PE devices, a set of Ethernet links between the host (possibly via the Customer End "CE" device) and these transmitting PE devices may provide additional redundancy. Such a set of Ethernet links between the host device and the plurality of transmitting PE devices to which the host is multi-homed to may form an ES (also known as LAG) having a certain ESI. Therefore, each of the plurality of transmitting PE devices may be coupled to a set of ESs depending on a number of host devices coupled to the PE device in the multi-homing architecture. The "LAG" may correspond to a network configuration that combines multiple physical network links into a single logical link (e.g., an ES) to provide redundancy. In various embodiments, the plurality of host devices may be MAC-addressable devices.

In many embodiments, the remote PE device facilitating the adaptive optimization of ECMP groups may include a processor, a transceiver, and a memory communicatively coupled to the processor. In the multi-homing architecture, the remote PE device may connect to the plurality of transmitting PE devices and host devices to ensure robust connectivity and load balancing. In a number of embodiments, the remote PE device may be further equipped with an optimization logic (for example, stored in the memory or implemented as a hardware component in the remote PE device) to facilitate adaptive optimization of ECMP groups in the multi-homing network. The remote PE device may receive a set of route advertisements of the plurality of transmitting PE devices. In other words, the plurality of transmitting PE devices may advertise corresponding ESIs and associated route advertisements (e.g., EVPN Route-Types 1, 2, and 5) to the remote PE device. The remote PE device may be configured to receive the set of route advertisements corresponding to Ethernet Auto Discovery (EAD) route advertisements. The "EAD route advertisements" may facilitate the discovery of ESs associated with the plurality of transmitting PE devices, helping announce PE membership in the LAG. An EAD route advertisement may include an ESI corresponding to an ES associated with a transmitting PE device to indicate that the same ES is reachable via the plurality of transmitting PE devices. For example, each transmitting PE device in a multi-homing set may advertise an EAD route with the same ESI to signal that they are part of the same ES. The EAD route advertisement may be further configured to indicate a weight attribute, indicating a total link count associated with the corresponding ES. That is to say, the weight attribute in an EAD route advertisement may be indicative of a total link count associated with an ES whose ESI is included in the EAD route advertisement. In other words, if a transmitting PE device is associated with multiple ESs, the remote PE device may receive multiple route advertisements from the transmitting PE device each indicating an ESI of one the ESs and a total link count (e.g., weight attribute) associated with the corresponding ES.

In a variety of embodiments, the remote PE device, based on the set of route advertisements, may allocate a shared ECMP group, including two or more transmitting PE devices of the plurality of transmitting PE devices, for at least two ESs of the set of ESs. For example, if the plurality of transmitting PE devices are associated with the set of ESs, instead of allocating an ECMP group per ES for the set of ESs, the remote PE device may allocate a shared ECMP group for two or more ESs combined. In more embodiments, the remote PE device may allocate the shared ECMP group based on an intersection of ESIs of the at least two ESs in route advertisements of the two or more transmitting PE devices. The intersection of ESIs may refer to the scenario where the two or more transmitting PE devices advertise the same ESIs, indicating that they are connected to the same ESs. In still more embodiments, the remote PE device may allocate the shared ECMP group based on an intersection of ESIs and weight attributes in route advertisements of the two or more PE devices. The intersection of ESIs and the weight attributes may refer to the scenario where the two or more transmitting PE devices advertise the same ESIs in their route advertisements, and also indicate the same link count for the corresponding ESs in their route advertisements. In other words, based on the set of route advertisements, the remote PE device may allocate the shared ECMP group for the at least two ESs coupled to an identical set of transmitting PE devices (e.g., the two or more transmitting PE devices). For example, if ESIs "A" and "B" are advertised by transmitting PE devices X1, X2, and X3 each with a weight attribute of "3" in corresponding route advertisements, the remote PE device may allocate a single ECMP group including devices X1, X2, and X3 for the two ESs "A" and "B".

In additional embodiments, the remote PE device may generate a next hop list in which the at least two ESs point to the shared ECMP group. That is to say, the "next hop list" may provide a set of potential next hops for route prefixes advertised in the set of route advertisements, and the at least two ESs listed as potential next hops in the next hop list point to the shared ECMP group. Thus, indicating that route prefixes mapped to the at least two ESs in the next hop list can be reached by any of the two or more transmitting PE devices in the shared ECMP group.

In further embodiments, the remote PE device may be configured to allocate separate ECMP groups for those ESs in the set of ESs which have no intersection of ESIs and weight attributes of transmitting PE device. Continuing the above example, if another ESI "C" with a weight attribute of "2" is advertised by a different subset of transmitting PE devices, say devices X2 and X3, the remote PE device may allocate a separate ECMP group including devices X2 and X3 for the ES "C".

In still further embodiments, the remote PE device may receive a route withdrawal advertisement of a transmitting PE device included in the shared ECMP group for one ES of the at least two ESs. The route withdrawal advertisement may be configured to indicate an ESI of the ES. In such an embodiment, the remote PE device may update the next hop list by removing the ES from pointing to the shared ECMP group. Further, the remote PE device may allocate a new ECMP group for the ES based on the route withdrawal advertisement. In other words, the new ECMP group may now include a set of transmitting PE devices that remain after removing the transmitting PE device from the two or more transmitting PE devices that were initially included in the shared ECMP group. Accordingly, the remote PE device may update the next hop list by causing the ES to now point to the new ECMP group. The route withdrawal advertisement can be received due to a link failure associated with the ES. In still additional embodiments, the remote PE device may detect a link failure associated with a transmitting PE device included in the shared ECMP group. In a scenario where the link failure is impacting one ES of the at least two ESs, the remote PE device may update the next hop list by removing the ES from pointing to the shared ECMP group and may cause the ES to now point to a new ECMP group including a set of transmitting PE devices that remain after removing the transmitting PE device from the two or more transmitting PE devices that were initially included in the shared ECMP group. However, in a scenario where the link failure is impacting all the connected ESs of the transmitting PE device, the remote PE device may update the shared ECMP group by removing the transmitting PE device associated with the detected link failure.

Thus, facilitating adaptive optimization of ECMP groups at the network device (e.g., the remote PE device) may significantly enhance network scalability, efficiency, and flexibility by overcoming hardware limitations, particularly in ASICs which only support a limited number of ECMP groups for MAC multipathing. Traditionally, such limitations, for example, allocation of only 256 ECMP groups for MAC multipathing may restrict the number of ESs across all multi-homing PEs on a given remote PE (RX-node), thereby capping the overall size of the EVPN-based network. By optimizing how ECMP groups are utilized, scaling of the multi-homing network beyond these hardware constraints may be possible, allowing for a greater number of ESs and LAGs without being limited by the ASIC's ECMP group capacity. This approach not only allows for larger and more complex EVPN deployments but also ensures more efficient resource use, reducing the need for additional infrastructure and lowering operational costs. In other words, the adaptive optimized ECMP groups may lead to a more scalable, reliable, and cost-effective EVPN network, overcoming the bottlenecks imposed by limited hardware resources.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system.". Furthermore, aspects of the present disclosure may take the form of a computer program product embodied in one or more non-transitory computer-readable storage media storing computer-readable and/or executable program code.

Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit. Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data. Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C.". An exception to this definition will occur only when a combination of elements, functions, steps, or acts are in some way inherently mutually exclusive.

Aspects of the present disclosure are described below with reference to schematic flowchart diagrams /d/ or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a schematic block diagram of an example multi-homing network architecture 100 in accordance with various embodiments of the disclosure is shown. In an example, the multi-homing network architecture 100 can be implemented using various technologies, for example, within Ethernet Virtual Private Network (EVPN) framework such as EVPN-Multiprotocol Label Switching (MPLS), EVPN-Virtual Extensible LAN (VXLAN), EVPN-Virtual Private Wire Service (VPWS), etc.

EVPN may be defined as a layer 2 VPN technology built over a Packet Switched Network (PSN) (e.g., utilizing an MPLS)/IP infrastructure). EVPN instances can include Customer End (CE) devices connected to Provider Edge (PE) devices that form the edge of a core network. An EVPN instance can further include one or more broadcast domains (e.g., one or more VLANs) that are assigned to a given EVPN instance by the provider of the EVPN service. EVPN may provide advanced multi-homing capabilities and uses Border Gateway Protocol (BGP) to distribute customer/client Media Access Control (MAC) address (C-MAC) reachability information over the core network, e.g., over the core MPLS/IP network. As those skilled in the art will recognize, the multi-homing network architecture 100 can refer to a high-speed, high-bandwidth interconnect system that enables multiple devices to communicate with each other efficiently and reliably. It is a network topology that is defined to provide a flexible and scalable infrastructure for data center, cloud environments, and other network elements.

In the embodiments shown in FIG. 1, the multi-homing network architecture 100 is shown to include a core network 102. In some aspects, the core network 102 can include and/or represent the physical layer or infrastructure (e.g., underlay) of the multi-homing network architecture 100. For example, the core network 102 can represent a data center(s) of one or more networks such as one or more cloud networks. In many embodiments, the core network 102 may be communicatively coupled to one or more overlay networks. The overlay networks can be created using a variety of different technologies, including, but not limited to, Virtual Private Networks (VPNs), software-defined networking (SDN), and peer-to-peer (P2P) networking. Various benefits of using an overlay network include increased security, improved scalability, the ability to support new services and applications without requiring changes to the underlying physical network infrastructure, etc. The overlay networks can utilize an overlay protocol, such as VXLAN, Virtual Generic Routing Encapsulation (VGRE), Virtualization Overlays Over Layer 3 (VO3), or Stateless Transport Tunnelling (STT), to encapsulate traffic in Layer 2 (L2) and/or Layer 3 (L3) packets which can cross overlay L3 boundaries within the network.

In several embodiments, the core network 102 may be connected to a plurality of host devices (for example, hosts H1 114 and H2 116). The example shown in FIG. 1 illustrates that the host H1 114 is multi-homed to three PE devices such as PE1 108, PE2 110, and PE3 112. These three PE devices (PE1 108, PE2 110, and PE3 112) may form a first Redundancy Group for the host H1 114. All pseudowires associated with a given host, e.g., pseudowires from the host H1 114 to each of the PE devices PE1 108, PE2 110, and PE3 112, are considered collectively as an Ethernet Segment (ES), identified by a certain ES Identifier (ESI), from the perspective of the PE devices PE1 108, PE2 110, and PE3 112. These pseudowires are indicated in FIG. 1 as links labeled with an ES identifier ESI1. As used herein, the term "pseudowire" may refer to a link, e.g., an Ethernet link, communicatively connecting a host or a Customer End (CE) device to a particular PE device so that data may be exchanged between these entities. In other words, a set of Ethernet links between the host H1 114 and the PE devices PE1 108, PE2 110, and PE3 112 of the first Redundancy Group may form a first ES identified by ESI1. Similarly, the host H2 116 is also shown to be multi-homed to the PE devices PE1 108, PE2 110, and PE3 112. Thus, these PE devices PE1 108, PE2 110, and PE3 112 further form a second Redundancy Group for the host H2 116. Thus, a set of Ethernet links between the host H2 116 and each of the PE devices PE1 108, PE2 110, and PE3 112 of the second Redundancy Group may form a second ES identified by ESI2.

Further, the example shown in FIG. 1 illustrates that a source 104 (denoted by "S" in FIG. 1) is coupled to a remote PE device 106 (denoted as "PEr"). The letter "r" in context of PE device PEr 106 may merely indicate that, in this and some following illustrative examples PE devices are considered as "remote". Further, the remote PE device PEr 106 may be configured to facilitate adaptive optimization of Equal Cost Multi-Path (ECMP) groups in the multi-homing network architecture 100. Adaptive optimization of ECMP groups is described in detail in conjunction with FIGS. 2-9.

Elements of FIG. 1 may be coupled to one another through one or more interfaces employing any suitable connections (wired or wireless), which provide viable pathways for network communications. Additionally, one or more of these elements may be combined, divided, or removed from the architecture based on particular configuration needs. For ease of illustration, not all elements of FIG. 1 are depicted with communication lines traversing the multi-homing network architecture 100.

In the multi-homing network architecture 100, network traffic, which could include packets, frames, signals, cells, datagrams, protocol data units (PDUs), data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/IP "TCP/IP", User Datagram Protocol/IP "UDP/IP"). A packet is a unit of data for communicating information in a network, and can be routed between a source node and a destination node via a network. A packet may include, for example, a source network address, a destination network address, and a payload containing the information to be communicated. By way of example, these network addresses can be IP addresses in a TCP/IP messaging protocol or MAC addresses. Information is generally represented by data, and as used herein, 'data' may refer to any type of binary, numeric, voice, video, media, textual, or script data, or any type of source or object code, or any other suitable information in any appropriate format that may be communicated from one point to another in electronic devices and/or networks.

Although a specific embodiment for a multi-homing network architecture 100 suitable for carrying out the various steps, processes, methods, and operations described herein is discussed with respect to FIG. 1, any of a variety of systems and/or processes may be utilized in accordance with embodiments of the disclosure. For example, the multi-homing network architecture 100 that include additional and/or different components and connections are contemplated herein and are within the scope of the present disclosure. For example, the multi-homing network architecture 100 can include any number of PE devices, not necessarily PE devices PE1 108, PE2 110, and PE3 112 and the remote PE device PEr 106 as shown in FIG. 1. Furthermore, although CE devices are not specifically shown in FIG. 1, one or more CE devices can be connected behind H1 114, H2 116, and S. For example, the host H1 114 may connect a first CE device to the PE devices PE1 108, PE2 110, and PE3 112 and the host H2 116 may connect a second CE device to the PE devices PE1 108, PE2 110, and PE3 112. Furthermore, although also not specifically shown in FIG. 1, respective access networks may connect each of the host H1 114 and the source 104 to their PE devices. The elements depicted in FIG. 1 may also be interchangeable with other elements of FIGS. 2-9 as required to realize a particularly desired embodiment. More details about an overlay network are described in more detail below.

Figure 2:
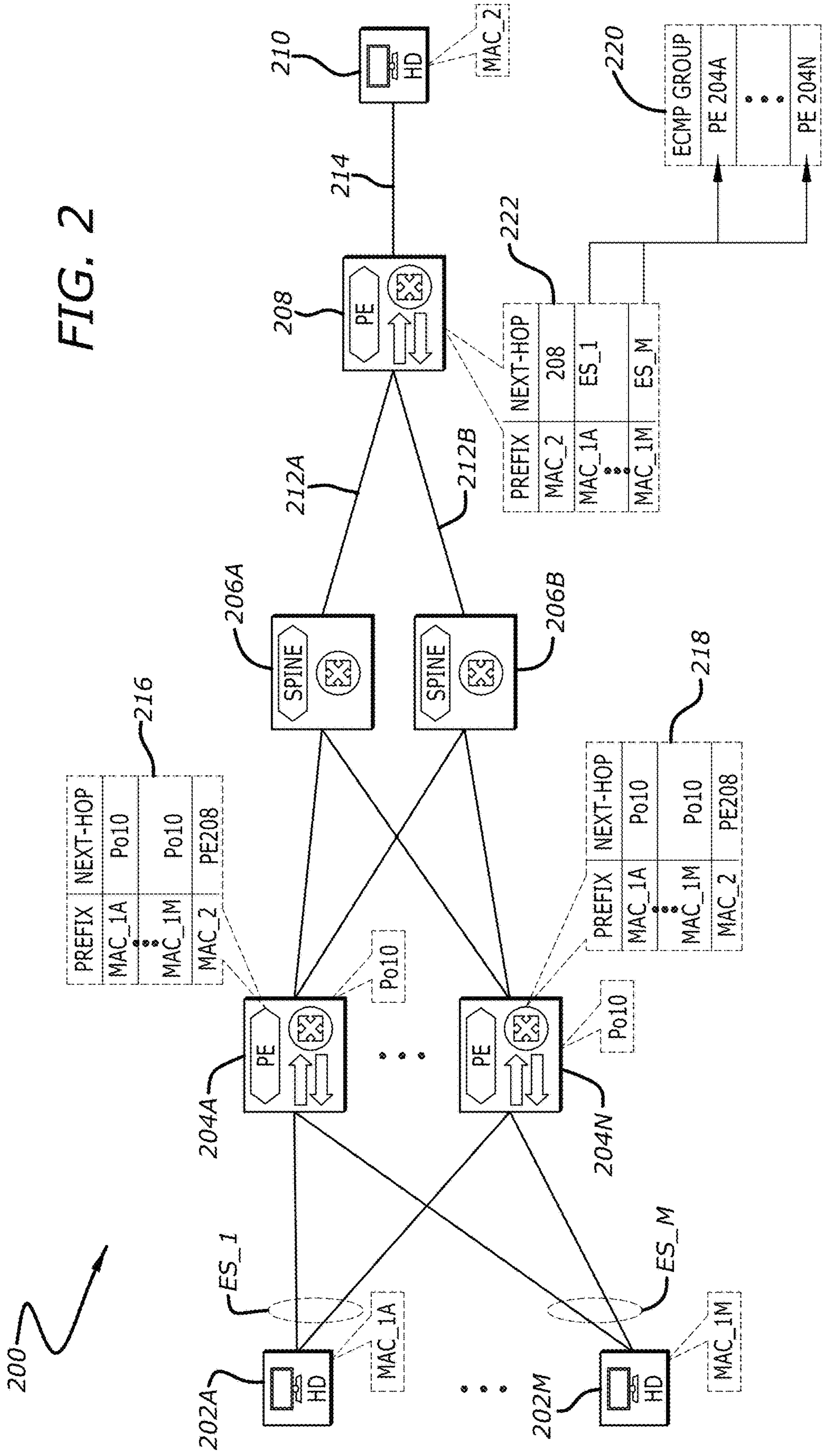
FIG. 2 is a schematic block diagram of an example network in accordance with various embodiments of the disclosure.

Referring to FIG. 2, a schematic block diagram of an example network 200 in accordance with various embodiments of the disclosure is shown. The network 200 can refer to a high-speed, high-bandwidth interconnect system that enables multiple devices to communicate with each other efficiently and reliably. The network 200 may conform to a network topology defined to provide a flexible and scalable infrastructure for data center, cloud environments, or other network environments. The network 200 can correspond to a multi-homing network implemented using various technologies, for example, within EVPN framework such as EVPN MPLS, EVPN-VXLAN, EVPN-VPWS, Segment Routing, etc. "Multi-homing" may refer to a network architecture strategy where a device or a network is connected to multiple upstream networks (e.g., network devices, or provider edge "PE" devices) or service providers simultaneously. In the embodiments shown in FIG. 2, the network 200 may include a plurality of host devices (denoted as "HD") 202A-M, (collectively "202") coupled to a plurality of PE devices 204A-204N (collectively "PE devices 204"). Here, M and N can be any integers greater than 1 as per network implementation. In an example, the network 200 may be a dual-homed network where N is equal to 2. Thus, each host device 202 can be connected to exactly two upstream PE devices 204 for redundancy. In another example, the network 200 can be a quad-homed network where N is equal to 4. Thus, each host device 202 can be connected to exactly four upstream PE devices 204 for redundancy.

In many embodiments, the host devices 202 can be multi-homed to the PE devices 204 via multiple physical links. A set of physical links connecting a host device (e.g., any of the host devices 202A-M) to the PE devices 204 may form an ES for that host device. Therefore, each PE device 204 may be coupled to a set of ESs depending on a number of host devices coupled to the PE device 204 in the multi-homing setup. Since "M" host devices 202 are shown to be coupled to each PE device 204 in FIG. 2, each PE device 204 may be coupled to M ESs. In the example FIG. 2, a first set of physical links connecting the host device 202A with the PE devices 204A-N may form a first ES. Similarly, an $M^{th}$ set of physical links connecting the host device 202M with the PE devices 204A-N may form an $M^{th}$ ES. Each ES may be uniquely identified by an ES Identifier (ESI) and the PE devices 204 may be aware of corresponding ESs through the associated ESI. ESIs may be utilized the PE devices 204 to identify the ES and to coordinate the distribution of traffic among the PE devices 204. In a multi-homed setup, the same ESI is configured on all PE devices connected to the same ES, indicating that they all serve the same host device. For example, the first set of physical links connecting the host device 202A with the PE devices 204A-N may be associated with a unique ESI "ES_1". Likewise, the $M^{th}$ set of physical links connecting the host device 202M with the PE devices 204A-N may be associated with another unique ESI "ES_M".

In various examples, the host devices 202 may include any computer or device associated with one or more IP addresses. For example, the host devices 202 may include servers, client devices, routers (e.g., CE routers), virtual nodes and/or any other device that may be configured as a Dynamic Host Configuration Protocol (DHCP) client. In various examples, the PE devices 204 can include leaf nodes used to connect with a network fabric (e.g., the core network 102 in FIG. 1). The PE devices 204 may support switching and/or routing functions. In further example, the PE devices 204 may correspond to VXLAN Tunnel Endpoint (VTEPS) that serve as the gateways for the host devices 202 into a wider network. In other words, the PE devices 204 may be responsible for encapsulating the traffic from the host devices 202 into VXLAN for transport across the network fabric (e.g., the EVPN). The PE devices 204 may include transmitting (TX) or sending nodes in the multi-homed setup, which bundles the traffic from the host devices 202. Hereinafter, the PE devices 204 may be interchangeably referred to as "transmitting PE devices 204". Further, in the embodiments shown in FIG. 2, the transmitting PE devices 204 are shown to be coupled to spine devices 206A-206B (collectively "spine devices 206").

Further, in the example embodiment shown in FIG. 2, the spine devices 206A-B are connected to a remote PE device 208, associated with a destination host device 210, via L3 connections (e.g., paths 212A and 212B). The remote PE device 208 may be communicatively coupled to the destination host device 210 via a physical link 214. The traffic from the host devices 202 may be destined for the destination host device 210. The host devices 202 and the destination host device 210 may be MAC addressable devices and may utilize MAC addresses to receive and send data frames over the network 200. Every network interface (e.g., Ethernet port, Wi-Fi adapter) on the host devices 202 and the destination host device 210 may have its own unique MAC address. In the example shown in FIG. 2, the host device 202A may be associated with a MAC address "MAC_1A", the host device 202M may be associated with a MAC address MAC_1M, and the destination host device 210 may be associated with a MAC address MAC_2.

In the multi-homed network, each PE device 204, connected to an ES may be configured to generate and transmit route advertisements (e.g., EVPN Route-Types 1, 2, 3, 4, 5, or the like) in a Border Gateway Protocol (BGP) control plane. Different EVPN Route-Types may serve distinct purposes in network communication. For example, the EVPN Route-Type 1 may be associated with Ethernet Auto Discovery (EAD) route that facilitates the discovery of EVPN instances and segments. Further, the EVPN Route-Type 2 may be associated with the MAC/IP advertisement route that advertises MAC addresses and optionally IP addresses, supporting host mobility and Layer 2/3 reachability within the EVPN domain. Furthermore, the Route-Type 5 may be associated with the IP Prefix route that disseminates IP prefixes, enabling L3 VPN services over EVPN by integrating IP routing information into the EVPN fabric. Likewise, other EVPN routes may serve other purposes in the network communication.

In a variety of embodiments, a route advertisement (e.g., EVPN Route-Types 1, 2, 5, or the like) transmitted by a transmitting PE device (e.g., any of the transmitting PE devices 204) may include, for example, an ESI, an IP address of the transmitting PE device, a route prefix, and associated VLAN information. In many examples, the IP address of the transmitting PE devices in the multi-homing network may be an anycast IP address. The term "anycast" may refer to a network addressing and routing methodology in which multiple PE devices in a multi-homing set share the same IP address. Traffic is routed to the nearest or best-performing node that shares this IP address. In a multi-homing scenario, anycast can be utilized to direct traffic to the closest or most optimal PE device. If one PE device fails, the traffic is automatically redirected to another PE device with the same anycast address, without needing to change the destination IP address. In the example embodiment shown in FIG. 2, the transmitting PE devices 204 are assigned anycast IP address "Po10". In a number of embodiments, the route advertisement may further include a weight attribute indicative of a total link count associated with an ES whose ESI is included in the route advertisement. For example, a route advertisement transmitted by the transmitting PE device 204A for a route prefix MAC_1A may include ES_1, the IP address Po10, a weight attribute "N" indicating the total link count associated with ES_1, and associated VLAN information. Further, another route advertisement transmitted by the transmitting PE device 204A for another route prefix MAC_1M may include ES_M, the IP address Po10, a weight attribute "N" indicating the total link count associated with ES_M, and associated VLAN information. Similarly, other transmitting PE devices 204B-N may generate and transmit route advertisements for corresponding route prefixes. For a MAC-addressable host device, a "route prefix" may refer to a portion of a MAC address of the host device that can be used to determine routing or forwarding decisions within the network environment. For example, for MAC-addressable host device 202A, route prefix can be MAC_1A.

In further embodiments, the transmitting PE devices 204 may be configured to store routing tables (e.g., routing tables 216 and 218) that maps various route prefixes to their respective next hop addresses. For example, route prefixes (MAC_1A, . . . , MAC_1M, MAC_2) of the host devices 202 and the destination host device 210 may be mapped to IP addresses of corresponding next hops. Thus, the route prefix MAC_1A is mapped to anycast IP address Po10, indicating that the transmitting PE devices 204 are the next hops for the host device 202A, while the route prefix MAC_2 of the destination host device 210 may be mapped to "PE 208" an IP address of the remote PE device 208.

In additional embodiments, the remote PE device 208 may include a processor, a network interface controller configured to provide access to a network including the plurality of host devices 202, the transmitting PE devices 204, the spine devices 206, and a memory coupled to the processor. The memory may include suitable logic, circuitry, and interfaces that are configured to store a machine code and/or the instructions executable by the processor. In an example, the memory may include an optimization logic configured to execute one or more operations for optimization of ECMP groups for routing traffic across the network 200. "ECMP groups" may be formed to optimize network performance by distributing traffic across multiple paths with the same cost to a destination device in the network. ECMP allows traffic to be distributed across multiple paths that have the same cost (or metric) to a destination. This prevents any single path from being overburdened while others remain underutilized. If one of the paths in an ECMP group fails, the traffic can be seamlessly rerouted to another path within the group. ECMP groups can further help in minimizing downtime by ensuring that even if a link or node goes down, the traffic can continue to flow through other available paths. Also, ECMP groups support the use of multiple pathways in a network, giving network architects the flexibility to design networks that can adapt to changing traffic.

In yet more embodiments, the optimization logic can be implemented as a standalone hardware component in the remote PE device 208. Examples of the processor may include, but are not limited to, an application-specific integrated circuit (ASIC) processor, a complex instruction set computing (CISC) processor, a central processing unit (CPU), an explicitly parallel instruction computing (EPIC) processor, a very long instruction word (VLIW) processor, and/or other processors or circuits. Further, examples of the memory may include, but are not limited to, a random-access memory (RAM), a read only memory (ROM), an electrically erasable programmable read-only memory (EEPROM), a hard disk drive (HDD), a solid-state drive (SSD), a CPU cache, a secure digital (SD) card, and/or a cloud-based memory. Furthermore, examples of the network interface /controller/ card (NIC) may include a gigabit Ethernet adapter or any other similar component.

In numerous embodiments, the remote PE device 208 may be configured to receive a set of route advertisements of the transmitting PE devices 204. In more embodiments, the remote PE device 208 may be further configured to allocate ECMP groups and generate a next-hop list to efficiently manage traffic across multiple paths in the network 200. Maintaining ECMP groups at the remote PE device 208 may support optimized routing by ensuring that the most efficient path is selected for traffic routing. Instead of allocating an ECMP group per ES, the remote PE device 208, based on executing the optimization logic, may be configured to allocate a single ECMP group for those ESs (two or more ESs) that are coupled to an identical set of transmitting PE devices (e.g., two or more transmitting PE devices).

In several embodiments, to allocate the ECMP groups, the remote PE device 208 may be configured to determine intersection of ESIs and/or weight attributes in the received set of route advertisements. The intersection of ESIs may refer to a scenario where two or more transmitting PE devices advertise the same set of ESIs in their route advertisements, indicating that they are connected to identical ESs. For example, as shown in FIG. 2, each transmitting PE device 204 is coupled to ES_1-ES_M ESs. Therefore, the transmitting PE devices 204 may advertise the same set of ESIs ES_1-ES_M in their route advertisements. Further, the weight attribute in each of the set of route advertisements may be indicated as "M", denoting the total link count in each of ES_1-ES_M ESs. As a result, the remote PE device 208 may determine that the transmitting PE devices 204, in the example scenario shown in FIG. 2, have advertised identical ESIs and weight attributes in their route advertisements, indicating that the transmitting PE devices 204 are connected to the same ESs.

In an example scenario, based on the set of route advertisements, the remote PE device 208 may determine whether a count of next hops for a route prefix is equal to the weight attribute advertised in route advertisements including the route prefix. For example, based on the set of route advertisements, the remote PE device 208 may determine that a total count of next-hops associated with a route prefix is "3" and route advertisements including the route prefix includes a weight attribute of "3", the remote PE device 208 may determine an intersection of ESIs and the weight attribute. However, based on the set of route advertisements, if the remote PE device 208 determines that a total count of next-hops associated with a route prefix is "3" and route advertisements including the route prefix includes does not include a weight attribute of "3", the remote PE device 208 may not determine an intersection of ESIs and the weight attributes.

In response to the determination of the intersection of ESIs and/or the weight attribute, the remote PE device 208 may allocate a shared ECMP group 220, including the plurality of transmitting PE devices 204, for the ESs ES_1-ES_M. In yet additional embodiments, the remote PE device 208 may be further configured to generate a next hop list 222 based on the allocation of the ECMP groups. The next hop list 222 may be configured to provide a set of potential next hops for route prefixes advertised in the set of route advertisements. For example, the next hop list 222 may provide a set of potential next hops for the route prefixes MAC_1A-MAC_1M and MAC_2. In the example embodiment shown in FIG. 2, the route prefix MAC_2 may be mapped to the next hop PE 208. Further, the route prefixes MAC_1A-MAC_1M are mapped to ES_1-ES_M, respectively. Since the remote PE device 208 has allocated the shared ECMP group 220 for the ESs ES_1-ES_M, the ESs ES_1-ES_M in the next hop list 222 are configured to point to the shared ECMP group 220. Thus, instead of allocating a separate ECMP group for each of the ESs ES_1-ES_M that are coupled to the identical set of transmitting PE devices 204, a single ECMP group is allocated.

Although a specific embodiment for the example network 200 suitable for carrying out the various steps, processes, methods, and operations described herein is discussed with respect to FIG. 2, any of a variety of systems and/or processes may be utilized in accordance with embodiments of the disclosure. For example, if there were an additional host device multi-homed to only the transmitting PE devices 204A and 204N via an additional ES including two links, the remote PE device 208 may receive other route advertisements from the transmitting PE devices 204A and 204N indicating the ESI of the additional ES and a weight attribute of "2" for the two links in the additional ES. In such a scenario, in addition to allocating the shared ECMP group 220, the remote PE device 208 may allocate a separate ECMP group including the transmitting PE devices 204A and 204N for the additional ES. In other words, ESs with commonality in the connected transmitting PE devices may be allocated a single shared ECMP group; however, an ES with no commonality in the connected transmitting PE devices may be allocated a separate non-shared ECMP group. The elements depicted in FIG. 2 may also be interchangeable with other elements of FIG. 1 and FIGS. 3-9 as required to realize a particularly desired embodiment.

Figure 3:
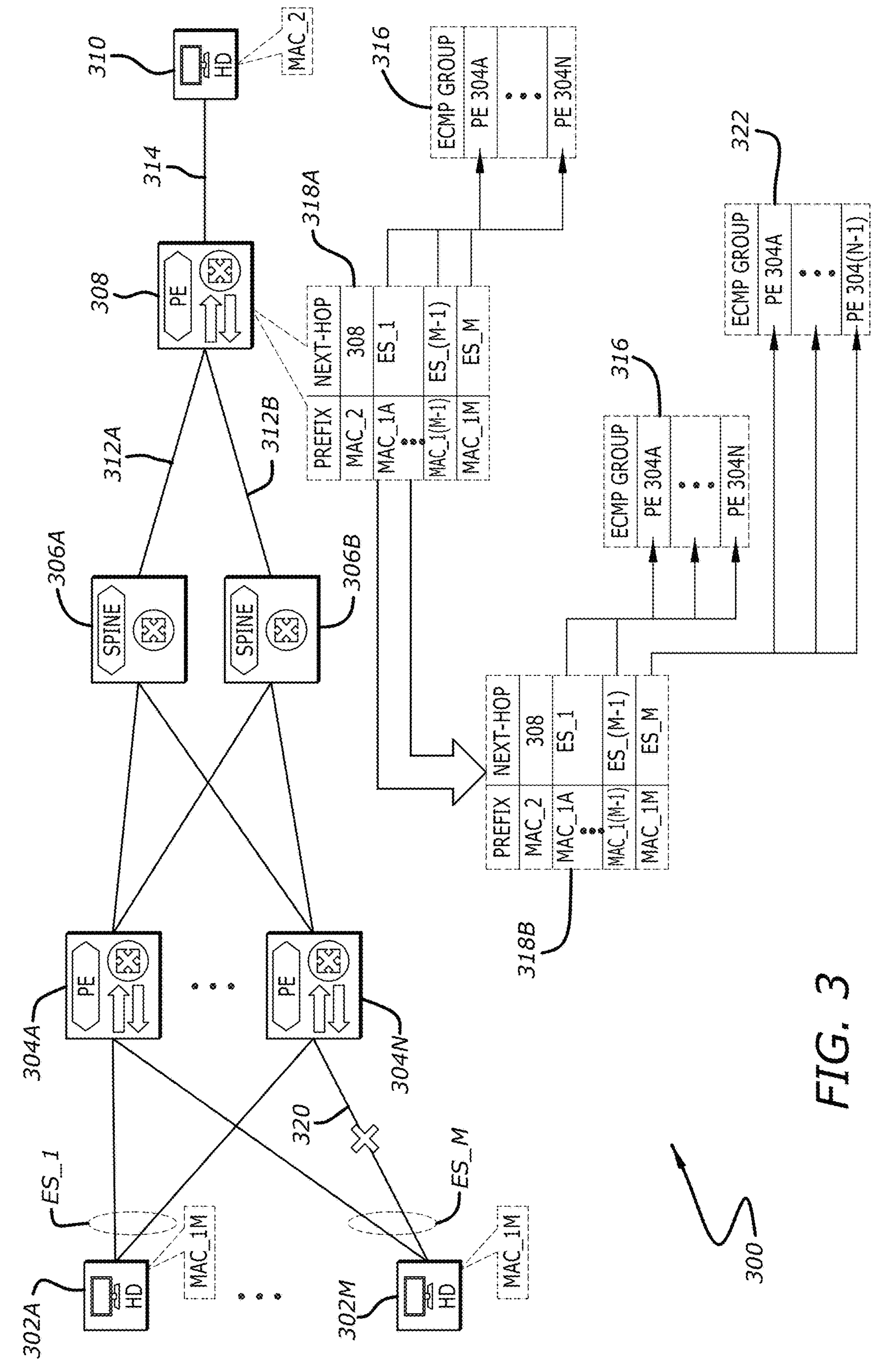
FIG. 3 is a conceptual network diagram of an example network facilitating optimized ECMP grouping in accordance with various embodiments of the disclosure.

Referring to FIG. 3, a conceptual diagram of an example network 300 facilitating optimized ECMP grouping in accordance with various embodiments of the disclosure is shown. The network 300 may correspond to a multi-homing network implemented using various technologies, for example, within EVPN framework. In the embodiments shown in FIG. 3, the network 300 may include a plurality of host devices (denoted as "HD") 302A-M, (collectively "302") coupled to a plurality of transmitting PE devices 304A-304N (collectively "transmitting PE devices 304"). Here, M and N can be any integers greater than 1 as per network implementation.

In many embodiments, the host devices 302 can be multi-homed to the transmitting PE devices 304 via multiple physical links. In the example FIG. 3, a first set of physical links connecting the host device 302A with the transmitting PE devices 304A-N may form a first ES identified by a unique ESI "ES_1". Similarly, an $M^{th}$ set of physical links connecting the host device 302M with the transmitting PE devices 304A-N may form an $M^{th}$ ES identified by a unique ESI "ES_M".

In various embodiments, the transmitting PE devices 304 can include leaf nodes used to connect with a network fabric (e.g., the core network 102 in FIG. 1). The transmitting PE devices 304 may correspond to VTEPS that serve as the gateways for the host devices 302 into a wider network. In further embodiments, the transmitting PE devices 304 may be coupled to spine devices 306A-306B (collectively "spine devices 306"). Further, in the example embodiment shown in FIG. 3, the spine devices 306A-B are connected to a remote PE device 308, associated with a destination host device 310, via paths 312A and 312B. The remote PE device 308 may be communicatively coupled to the destination host device 310 via a physical link 314. The host devices 302 and the destination host device 310 may be MAC-addressable devices. For example, as shown in FIG. 3, the host devices 302A is associated with a MAC address "MAC_1A", the host device 302M is associated with a MAC address "MAC_1M", and the destination host device 310 is associated with a MAC address "MAC_2".

In the multi-homed network 300, each transmitting PE device 304 may be configured to transmit route advertisements (e.g., EVPN Route-Types 1, 2, 3, 4, 5, or the like) in a BGP control plane. A route advertisement (e.g., EVPN Route-Types 1, 2, 5, or the like) transmitted by a transmitting PE device (e.g., any of the transmitting PE devices 304) may include, for example, an ESI, an IP address of the transmitting PE device, a route prefix, a weight attribute indicative of a total link count associated with the ESI, and associated VLAN information. For example, a route advertisement transmitted by the transmitting PE device 304N for a route prefix MAC_1M may include ES_M, the IP address Po10, a weight attribute "N" indicating the total link count associated with ES_M, and associated VLAN information.

In additional embodiments, the remote PE device 308 may include a processor, a network interface controller configured to provide access to a network including the plurality of host devices 302, the transmitting PE devices 304, the spine devices 306, a memory coupled to the processor, and an optimization logic. In an example, the memory may include the optimization logic. In other examples, the optimization logic can be implemented as a standalone hardware component in the remote PE device 208. The optimization logic may be configured to execute one or more operations for optimization of ECMP groups for routing traffic across the network 300, as described in the foregoing description of FIG. 2.

In numerous embodiments, the remote PE device 308 may be configured to receive a set of route advertisements of the transmitting PE devices 304. In more embodiments, the remote PE device 308 may be further configured to allocate ECMP groups and generate a next-hop list to efficiently manage traffic across multiple paths in the network 300, as described in the foregoing description of FIG. 2. In several embodiments, the remote PE device 308 may be configured to determine intersection of ESIs and/or weight attributes in the received set of route advertisements and allocate the ECMP groups based on the determined intersections. In the example scenario shown in FIG. 3, the remote PE device 308 is shown to have allocated a shared ECMP group 316 for at least two ESs, such as ESs associated with ES_1-ES_M, where the shared ECMP group 316 includes two or more transmitting PE devices, such as the transmitting PE devices 304A-304N. Further, the remote PE device 308 has generated a next hop list 318A based on the allocation of the ECMP groups, e.g., the shared ECMP group 316. The next hop list 318A may be configured to provide a set of potential next hops for route prefixes advertised in the set of route advertisements. For example, the next hop list 318A may provide a set of potential next hops for the route prefixes MAC_1A-MAC_1M and MAC_2. The route prefix MAC_2 is mapped to the next hop PE 308 in the next hop list 318A. Further, the route prefixes MAC_1A-MAC_1M are mapped to ES_1-ES_M, respectively in the next hop list 318A. Since the remote PE device 308 has allocated the shared ECMP group 316 for the ESs ES_1-ES_M, the ESs ES_1-ES_M in the next hop list 318A point to the shared ECMP group 316.

In additional embodiments, the remote PE device 308 may be configured to receive a route withdrawal advertisement of a transmitting PE device of the plurality of transmitting PE devices 304 included in the shared ECMP group 316. In the example embodiment shown in FIG. 3, the transmitting PE device 304N may encounter a link failure on a link 320 connected to the host device 302M and included in the ES ES_M. As a result, the transmitting PE device 304N may generate and transmit the route withdrawal advertisement to withdraw a route for the route prefix MAC_1M. The remote PE device 308 may receive the route withdrawal advertisement of the transmitting PE device 304N.

In yet further embodiments, upon receiving the route withdrawal advertisement of the transmitting PE device 304N, the remote PE device 308 may be configured to determine whether the transmitting PE device 304N included in any shared ECMP groups. In a scenario where the transmitting PE device 304N is not included in any shared ECMP group, the remote PE device 308 may remove the transmitting PE device 304N from all non-shared ECMP groups that the transmitting PE device 304N is a member of. However, in the current example embodiment shown in FIG. 3, the remote PE device 308 may determine that the transmitting PE device 304N is included in the shared ECMP group 316.

In such embodiments where the remote PE device 308 determines that the route withdrawal advertisement is of a member of a shared ECMP group, the remote PE device 308 may be configured to update the next hop list 318A to obtain an updated next hop list 318B and generate one or more new ECMP groups, for example, a new ECMP group 322. To update the next hop list 318A to the updated next hop list 318B, the remote PE device 308 may be configured to remove the ES (e.g., ES_M) indicated in the route withdrawal advertisement from pointing to the shared ECMP group 316. As illustrated in FIG. 3, in the updated next hop list 318B, the ES ES_M, which was indicated in the route withdrawal advertisement of the transmitting PE device 304N, does not point to the shared ECMP group 316. However, other ESs ES_1-ES_(M-1) corresponding to route prefixes MAC_1A-MAC_1(M-1), respectively, may continue pointing to the shared ECMP group 316 including the transmitting PE devices 304A-304N.

In still additional embodiments, the remote PE device 308 may be configured to allocate a new ECMP group for the ES ES_M based on the route withdrawal advertisement. In the example embodiment shown in FIG. 3, the remote PE device 308 may allocate a new ECMP group 322 to the ES_M. The new ECMP group 322 may include a set of transmitting PE devices (e.g., transmitting PE devices 304A-304(N-1)) that may remain after removing the transmitting PE device 304N from the shared ECMP group 316. The remote PE device 308 may further update the next hop list 318B by causing the ES ES_M, indicated in the route withdrawal advertisement, to point to the new ECMP group 322. As illustrated in FIG. 3, in the updated next hop list 318B, the ES ES_M, which was indicated in the route withdrawal advertisement of the transmitting PE device 304N, now points to the new ECMP group 322.

In a dual-homing setup (for N=2), if at any point in time the remote PE device 308 determines that the total BGP next-hops received via EVPN route advertisements is >2 while the total link weight indicated by the weight attributes is=2, or the total BGP next-hops received by EVPN route advertisements is=2 while the total link weight indicated by the weight attributes is >2, the remote PE device 308 may allocate one ECMP group per ES.

In many further embodiments, the transmitting PE device 304N may experience a technical fault causing the transmitting PE device 304N to withdraw routes for all route prefixes, for example, MAC_1A-MAC_1M. In such embodiments, the remote PE device 308 may be configured to update the shared ECMP group 316 instead of updating the next hop list 318A. For example, the remote PE device 308 may update the shared ECMP group 316 by removing the transmitting PE device 304N from the shared ECMP group 316. The other ESs ES_1-ES_M corresponding to route prefixes MAC_1A-MAC_1M, respectively, may continue pointing to the updated shared ECMP group 316 excluding the transmitting PE devices 304N.

Although a specific embodiment for illustrating an example network 300 facilitating optimized ECMP grouping suitable for carrying out the various steps, processes, methods, and operations described herein is discussed with respect to FIG. 3, any of a variety of systems and/or processes may be utilized in accordance with embodiments of the disclosure. In many non-limiting examples, an ECMP group may be shared for two or more ESs and a Bridge domain combination. In other words, the remote PE device 308 may allocate the shared ECMP group 316 for a Bridge Domain combination including one or more bridge domains. "Bridge domain combination" may include one or more L2 broadcast domains. Bridge domains may be utilized to isolate and manage traffic within a specific L2 segment across the network, and multiple Bridge domains can co-exist within a single EVPN instance. The elements depicted in FIG. 3 may also be interchangeable with other elements of FIGS. 1-2 and FIGS. 4-9 as required to realize a particularly desired embodiment.

Referring to FIG. 4, an example diagram of a Table 400 highlighting comparative analysis between optimized ECMP group allocation and non-optimized ECMP group allocation in accordance with various embodiments of the disclosure is shown. For the sake of brevity, the comparative analysis between the optimized ECMP group allocation and the non-optimized ECMP group allocation is described with respect to dual-homing network implementations. In the example embodiment shown in Table 400, rows 402A-D may correspond to different dual-homing network implementations. For example, row 402A may correspond to a dual-homing network implementation including 1 dual-homing PE set (i.e., 2 PE devices), with each PE managing 200 ESs, amounting to 200 ESs in the network. Row 402B may correspond to a dual-homing network implementation including 25 dual-homing PE sets (i.e., 50 PE devices), with each PE managing 200 ESs, amounting to 5,000 ESs in the network. Row 402C may correspond to a dual-homing network implementation including 50 dual-homing PE sets (i.e., 100 PE devices), with each PE managing 200 ESs, amounting to 10,000 ESs in the network. Row 402D may correspond to a dual-homing network implementation including 250 dual-homing PE sets (i.e., 500 PE devices), with each PE managing 200 ESs, amounting to 50,000 ESs in the network.

Further, column 404 in Table 400 may represent a parameter of a total number of PE devices in a dual-homing network implementation. Column 406 may represent a parameter of a number of PE sets in the dual-homing network implementation. Column 408 may represent a parameter of a number of ESs associated with each PE in the dual-homing network implementation. Column 410 may represent a weight attribute (e.g., a total number of links per ES) advertised by each PE in route advertisements for corresponding ESs. Column 412 may represent a count of ECMP groups as per non-optimized ECMP group allocation, while column 414 may represent a count of ECMP groups as per optimized ECMP groups allocation.

The row 402A indicates that in the dual-homing network implementation including 1 dual-homing PE set, with each PE managing 200 ESs, 200 ECMP groups are allocated without optimization. With optimization, the number of ECMP groups is reduced to 1. In a data center fabric, it is very common to deploy 50 to 100 PEs with each pair of PEs hosting multiple Dual-Homed LAGs, example, 200 as shown in FIG. 4. That is to say, the row 402B indicates for these 25 dual-homing PE sets, without optimization, 5,000 ECMP groups are allocated (column 412), while with optimization the number of ECMP groups is reduced to 25 (column 414). Similarly, the row 402C indicates for 50 dual-homing PE sets, without optimization, 10,000 ECMP groups are allocated (column 412), while with optimization, the number of ECMP groups is reduced to 50 (column 414). Larger environments with 250 or 500 PEs also exist and do have a similar requirement for Dual-Homed LAGs. For example, the row 402D indicates for 250 dual-homing PE sets, without optimization, 50,000 ECMP groups are allocated (column 412), while with optimization the number of ECMP groups is reduced to 250. The comparative analysis between the optimized ECMP group allocation as described in the disclosure and a non-optimized ECMP group allocation scheme illustrates the reduction in hardware resource consumption for ECMP group allocation.

Although a specific embodiment for a table highlighting comparative analysis between optimized ECMP group allocation and non-optimized ECMP group allocation suitable for carrying out the various steps, processes, methods, and operations described herein is discussed with respect to FIG. 4, any of a variety of systems and/or processes may be utilized in accordance with embodiments of the disclosure. For example, the comparative analysis further indicates that the scaling of the multi-homing network beyond these hardware constraints may be possible, allowing for a greater number of ESs and LAGs to be hosted without being limited by the ASIC's ECMP group capacity. In other words, making the ECMP group allocation independent of ESs, e.g., on sharing basis for multiple ESs, may release hardware resources for scaling the multi-homing network. The elements depicted in FIG. 4 may also be interchangeable with other elements of FIGS. 1-3 and 5-9 as required to realize a particularly desired embodiment.

Figure 5:
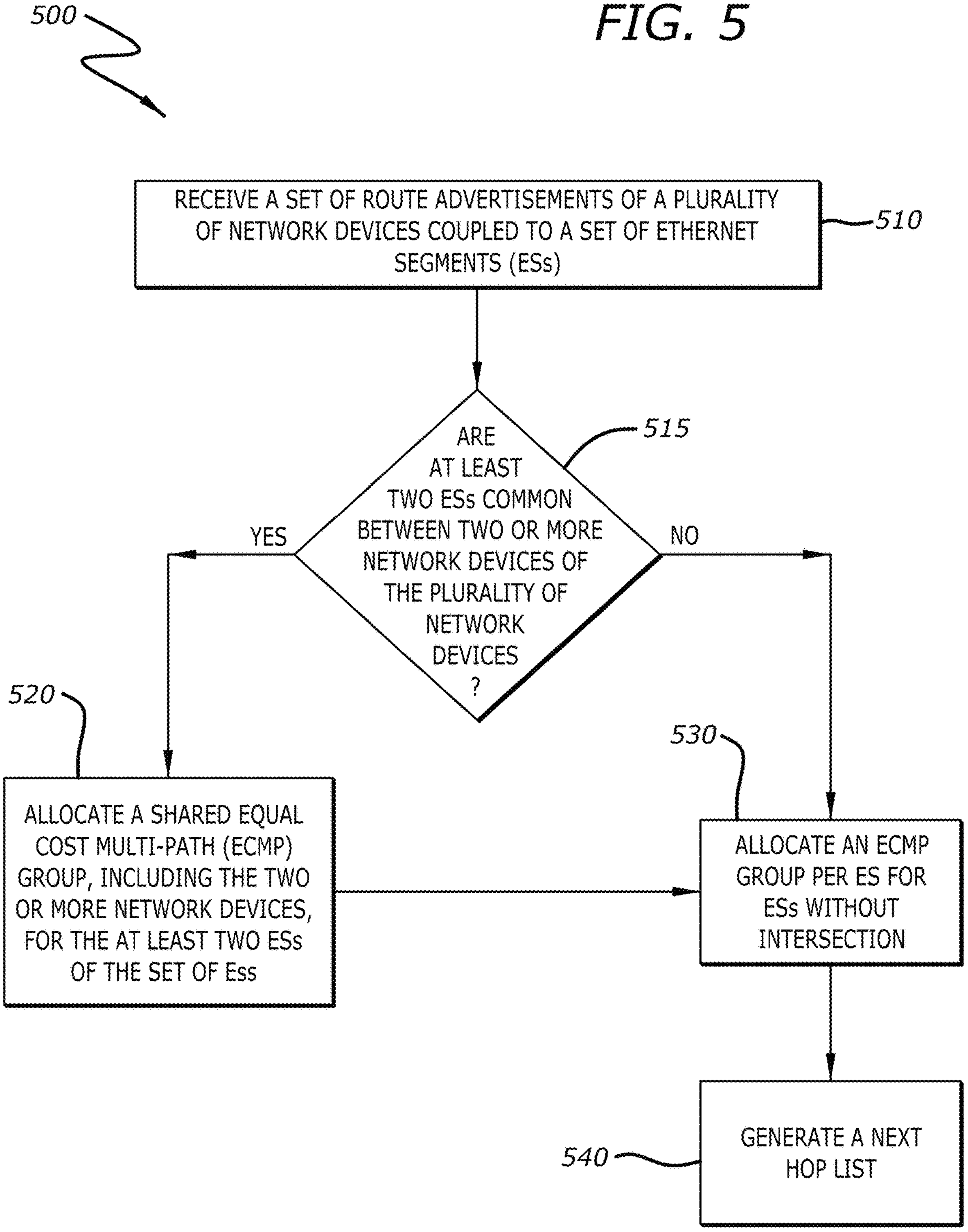
FIG. 5 is a flowchart depicting a process for allocation of a shared ECMP group in a multi-homing network in accordance with various embodiments of the disclosure.

Referring to FIG. 5, a flowchart depicting a process 500 for allocation of a shared ECMP group in a multi-homing network in accordance with various embodiments of the disclosure. In many embodiments, the process 500 may receive a set of route advertisements of a plurality of network devices coupled to a set of ethernet segments (ESs) (block 510). The plurality of network devices (e.g., transmitting PE devices) may be part of the multi-homing network and may be connected to a plurality of host devices via the set of ESs. Each of the plurality of network devices may generate and transmit one or more route advertisements for advertising corresponding route prefixes. The set of route advertisements may correspond to EVPN route advertisements. More specifically, the set of route advertisements may correspond to EAD route advertisements. A route advertisement transmitted by a transmitting PE device may include an ESI of one of the ESs coupled to the network device, an IP address of the transmitting PE device, a route prefix, a weight attribute associated with the ES, and associated VLAN information. That is to say, the weight attribute in the route advertisement may be indicative of a total link count associated with the ES (e.g., the LAG). In other words, the set of route advertisements facilitate the discovery of ESs, helping announce PE router membership in the LAG.

In a number of embodiments, the process 500 may determine whether at least two ESs are common between two or more network devices (e.g. two or more PE devices) of the plurality of network devices (block 515). The process 500 may analyze the ESs associated with each network device after receiving the set of route advertisements. The two or more network devices may correspond to a multi-homing set connected to identical ESs. In other words, instead of allocating an ECMP group per ES, the process 500 may allocate a single ECMP group for those ESs (e.g., the at least two ESs) that are coupled to an identical set of transmitting PE devices (e.g., the two or more network devices). To determine whether the at least two ESs are common between the two or more network devices, the process 500 may determine intersection of ESIs and/or weight attributes in the received set of route advertisements. Determining the intersection of ESIs and/or weight attributes may refer to determining whether the two or more network devices have advertised the same set of ESIs and similar weight attributes in their route advertisements. In other words, the process 500 may determine whether any ESs are shared or common between the two or more transmitting PE devices. If the process 500 identifies the at least two ESs connected to identical set of transmitting PE devices (e.g., the two or more network devices), it may indicate that ECMP group allocation can be optimized. In various embodiments, the process 500 may identify one or more sets of ESs, each including at least two ESs connected to identical set of transmitting PE devices. In yet various embodiments, the process 500 may not identify any set of ESs connected to identical set of transmitting PE devices.

In response to determining that at least two ESs are common between the two or more network devices, in a variety of embodiments, the process 500 may allocate a shared ECMP group, including the two or more network devices, for the at least two ESs of the set of ESs (block 520). "ECMP" is a routing strategy that allows data packets to be distributed evenly across multiple paths that have the same cost or distance to the destination device. By grouping the two or more transmitting PE devices that share the same ESs into a single ECMP group, the process 500 can optimize the routing process and hardware resource utilization, ensuring that data packets can be sent through the two or more network devices efficiently. The shared ECMP group may include all those transmitting PE devices that are connected to the common ESs or identical set of ESs, allowing for redundancy and load balancing. In more embodiments, the process 500 may allocate the shared ECMP group based on the intersection of ESIs and/or the weight attributes of the at least two ESs in the route advertisements of the two or more transmitting PE devices. After allocating the shared ECMP group for one set of common ESs, the process 500 may move to a set of common ESs until shared ECMP groups are allocated for all determined sets of common ESs.

In several embodiments, the process 500 may allocate an ECMP group per ES for ESs without intersection (block 530). In other words, for the ESs that do not share any common connections between two or more transmitting PE devices of the plurality of transmitting PE devices, the process 500 may, allocate separate ECMP groups. The process 500 may treat all such ESs independently, and a dedicated ECMP group is created for each ES.

In still additional embodiments, once ECMP groups (shared or non-shared) are allocated to all ESs in the set of ESs, the process 500 may generate a next hop list (block 540). The next hop list may include specific paths or next hops that data packets should take to reach their destination. The process 500 may generate the next hop list based on the ECMP group allocation at blocks 520 and 530. The next hop list may be configured to provide a set of potential next hops for route prefixes advertised in the set of route advertisements. Further, in numerous embodiments, in the next hop list, the at least two ESs for which the shared ECMP group is allocated, are configured to point to the shared ECMP group, and ESs for which non-shared ECMP groups are allocated point to corresponding non-shared ECMP groups. Thus, instead of allocating a separate ECMP group for each of the set of ESs, the process 500 leverages commonality between transmitting PE devices connected to the set of ESs and eliminates redundant ECMP groups.

Although a specific embodiment for allocation of a shared ECMP group in a multi-homing network suitable for carrying out the various steps, processes, methods, and operations described herein is discussed with respect to FIG. 5, any of a variety of systems and/or processes may be utilized in accordance with embodiments of the disclosure. For example, the process 500 may receive a route withdrawal advertisement of a network device (e.g., transmitting PE device) for an ES of the at least two ESs, and in response may update at least one of the next hop list or the shared ECMP group. The elements depicted in FIG. 5 may also be interchangeable with other elements of FIGS. 1-4 and 6-9 as required to realize a particularly desired embodiment.

Figure 6:
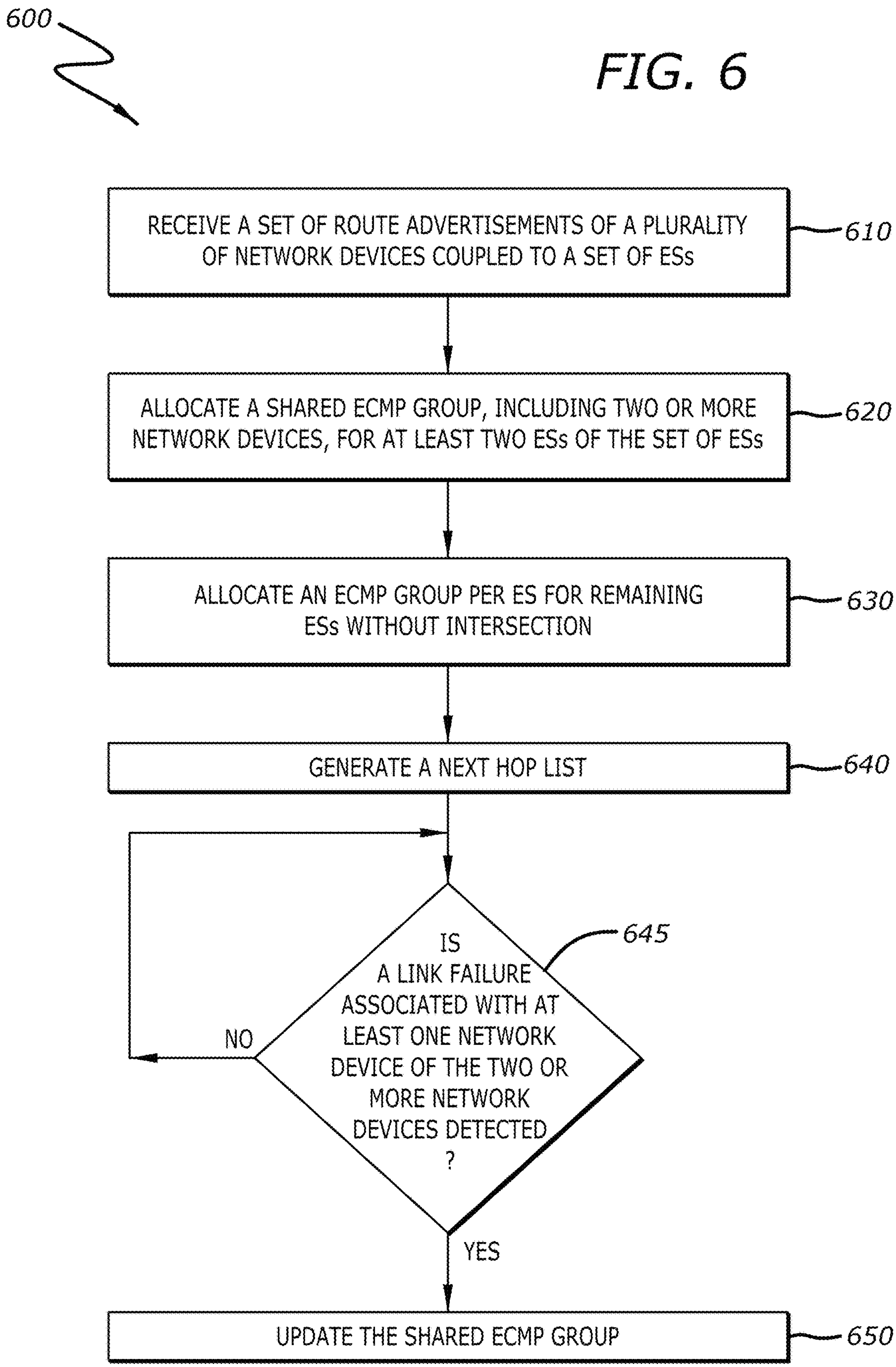
FIG. 6 is a flowchart showing a process for updating a shared ECMP group on detection of a link failure in accordance with various embodiments of the disclosure.

Referring to FIG. 6, a flowchart showing a process 600 for update of a shared ECMP group on detection of a link failure in accordance with various embodiments of the disclosure is shown. In many embodiments, the process 600 may receive a set of route advertisements of a plurality of network devices coupled to a set of ESs (block 610). The plurality of network devices may correspond to transmitting PE devices that are a part of a multi-homing network. The plurality of network devices may be coupled to a plurality of host devices via the set of ESs. The set of ESs may serve as the physical or logical connections between the plurality of host devices and the plurality of network devices, allowing for load balancing and redundancy. In various embodiments, the plurality of host devices may be MAC-addressable. Each of the plurality of network devices may transmit route advertisement(s) for advertising corresponding route prefixes and related routing information. For example, a route advertisement transmitted by a network device may include an ESI of one of the ESs coupled to the network device, an IP address of the network device, a route prefix, a weight attribute associated with the ES, and associated VLAN information.

In a number of embodiments, the process 600 may allocate a shared ECMP group, including two or more network devices, for at least two ESs of the set of ESs (block 620). The process 600 may analyze the set of route advertisements for an intersection of ESIs of the set of ESs. In other words, the process 600 may determine whether any ES is shared or common between the two or more network devices. Specifically, the process 600 may check if there are at least two ESs that are coupled to an identical set of network devices, e.g., the two or more network devices, among the plurality of network devices. In still more embodiments, the process 600 may allocate the shared ECMP group based on an intersection of ESIs and weight attributes of the at least two ESs in route advertisements of the two or more network devices. In other words, to determine intersection of ESIs and/or weight attributes of the at least two ESs, the process 600 may identify a count of next hops associated with each advertised route prefix based on the set of route advertisements. The weight attribute may correspond to a total link count in a corresponding LAG/ES. For example, in a dual-homing network including at least two ESs and at least one dual-homing PE set, if total BGP next-hops received by EVPN EAD routes is =2 and the total link weight is =2, the process 600 may allocate one shared ECMP group for the at least two ESs instead of one ECMP group per ES.

In a variety of embodiments, the process 600 may allocate an ECMP group per ES for remaining ESs without intersection (block 630). In other words, for any remaining ESs that do not have a commonality in the connected network devices, the process 600 may allocate an individual ECMP group for each ES. That is to say, when there is no intersection in the ESIs and/or the weight attributes, the process 600 may allocate a non-shared ECMP group for these ESs. Continuing the above example, in the dual-homing network including at least two ESs and at least one dual-homing PE set, if total BGP next-hops received by EVPN EAD routes is >2 while total link weight is =2, or the total BGP next-hops received by EVPN EAD routes is =2 while the total link weight is >2, the process 600 may allocate one non-shared ECMP group per ES.

In numerous embodiments, the process 600 may generate a next hop list (block 640). For example, once the allocation of ECMP groups to the set of ESs is complete, the process 600 can proceed to generate the next hop list. The "next hop list" may provide a set of potential next hops for the plurality of network devices for routing. Further, in numerous further embodiments, in the next hop list, the at least two ESs for which the shared ECMP group is allocated, are configured to point to the shared ECMP group, and ESs for which non-shared ECMP groups are allocated point to corresponding non-shared ECMP groups. Based on the next hop list, the multi-homing network is prepared to route data according to the optimized ECMP groups.

In a variety of embodiments, the process 600 may determine whether a link failure associated with at least one network device of the two or more network devices is detected (block 645). In other words, the process 600 may monitor the network for any link failures associated with at least one network device included in the shared ECMP group. In several embodiments, network devices may indicate link failures by transmitting route withdrawal advertisements for ESs associated with the link failure. If no link failures are detected, the process 600 may continue to monitor the network without making changes to the routing configuration (e.g., the next hop list and/or the shared ECMP group) (block 645).

However, if a link failure is detected, in additional embodiments, the process 600 may update the shared ECMP group (block 650). The update may involve adjusting the routing paths to exclude the failed links, ensuring that traffic can still be routed efficiently through the remaining network paths. The process 600 may recalculate the next hop list and any other relevant routing information (e.g., the shared ECMP group) to reflect the changes. In an example, a network device included in the shared ECMP group may encounter a technical glitch and experience link failure on all connected links. In such a scenario, the process 600 may update the shared ECMP group by removing the network device from the shared ECMP group. In other examples, the network device included in the shared ECMP group may experience link failure on one or more connected links while certain links of the network device may still be operational. In such an embodiment, the process 600 may update the next hop list by removing all those one or more ESs from pointing to the shared ECMP group that are associated with the link failure. The process 600 may further generate a new ECMP group (shared or non-shared) for the one or more ESs associated with link failure and may cause these ESs in the next hop list to now point to the new ECMP group. The new ECMP group may include a set of network devices that remain if the network device experiencing link failure were removed from the shared ECMP group.

Although a specific embodiment for updating an ECMP group on detection of a link failure suitable for carrying out the various steps, processes, methods, and operations described herein is discussed with respect to FIG. 6, any of a variety of systems and/or processes may be utilized in accordance with embodiments of the disclosure. For example, the new ECMP group may be a new shared ECP group or a new non-shared ECMP group based on commonality between two or more ESs associated with the link failure. The elements depicted in FIG. 6 may also be interchangeable with other elements of FIGS. 1-5, and FIGS. 7-9 as required to realize a particularly desired embodiment.

Figure 7:
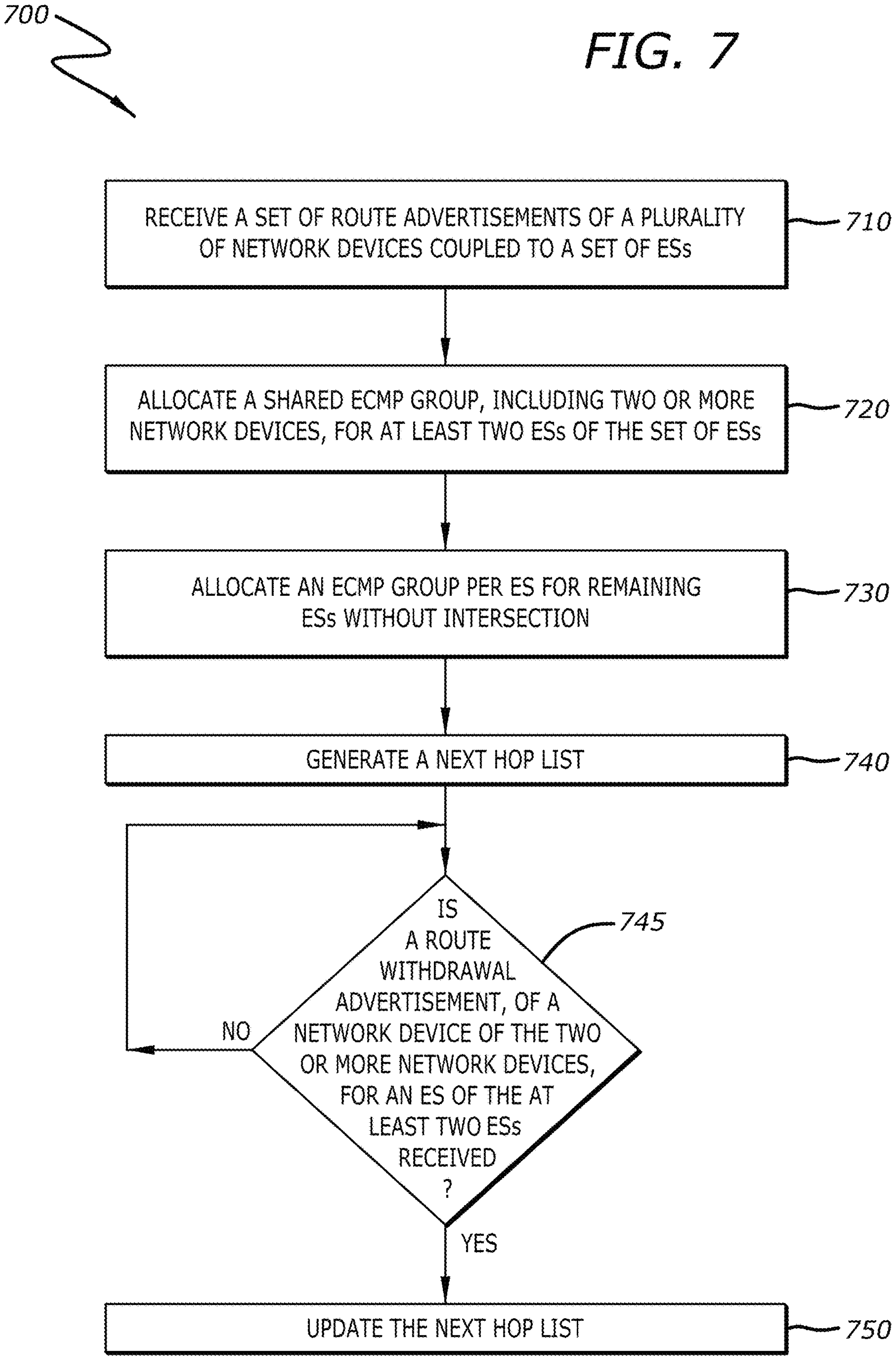
FIG. 7 is a flowchart showing a process for updating a next hop list based on route withdrawal advertisements in accordance with various embodiments of the disclosure.

Referring to FIG. 7, a flowchart showing a process 700 for updating a next hop list based on route withdrawal advertisements in accordance with various embodiments of the disclosure is shown. In many embodiments, the process 700 may receive a set of route advertisements of a plurality of network devices coupled to a set of ESs (block 710). The plurality of network devices may be transmitting PE devices in a multi-homing network that are connected to a plurality of host devices via the set of ESs. The set of route advertisements may correspond to EVPN route advertisements. For example, the set of route advertisements may include advertisements for EVPN Route-Types 1, 2, and 5. A route advertisement of the set of route advertisements may include an ESI of an ES coupled to a network device, an IP address of the network device, a route prefix, a weight attribute associated with the ES, and associated VLAN information. The weight attribute in the route advertisement may be indicative of a total link count associated with the ES. In various embodiments, the process 700 may be executed at a remote network device coupled to the plurality of network devices.

In a variety of embodiments, the process 700 may allocate a shared ECMP group, including two or more network devices, for at least two ESs of the set of ESs (block 720). In other words, after collecting the set of route advertisements from the plurality of network devices, the process 700 may analyze the set of route advertisements for an intersection of ESIs and/or weight attributes and may allocate the shared ECMP group for the at least two ESs that are coupled to the same set of two or more network devices. In other words, the process 700 may determine whether any ESs are shared or common between the two or more network devices. The purpose of this shared ECMP group is to prevent creation of redundant ECMP groups including the same network devices for two or more ESs.

In a number of embodiments, the process 700 may allocate an ECMP group per ES for remaining ESs without intersection (block 730). In other words, the process 700 may allocate a separate ECMP group for an ES that is not connected to the same network devices as another ES. That is to say, when there is no intersection or commonality for an ES, the process 700 may allocate a separate ECMP group to the ES.

In several embodiments, the process 700 may generate a next hop list (block 740). After the ECMP groups are allocated for the set of ESs, the next hop list may be generated. The next hop list may serve as a routing table that outlines the possible paths that data packets can take as they traverse the network. Further, in several additional embodiments, in the next hop list, the at least two ESs for which the shared ECMP group is allocated, are configured to point to the shared ECMP group, and ESs for which non-shared ECMP groups are allocated point to corresponding non-shared ECMP groups. Based on the next hop list, the multi-homing network is prepared to route data according to the optimized ECMP groups.

In still more embodiments, the process 700 may determine whether a route withdrawal advertisement, of a network device of the two or more network devices, for an ES of the at least two ESs is received (block 745). In yet more embodiments, the route withdrawal advertisement may include, for example, a notification from the network device indicating that a particular route is no longer available. Specifically, the process 700 may determine whether the route withdrawal advertisement is received from any network device included in the shared ECMP group. If no route withdrawal advertisement is received, the process 700 may continue to monitor the network, ensuring that the routing configuration (e.g., the next hop list and the allocated ECMP groups) remains valid (block 745).

In still yet more embodiments, if the route withdrawal advertisement is received, the process 700 may update the next hop list (block 750). The update may involve removing the withdrawn route from the next hop list and adjusting the remaining paths to ensure continued efficient data transmission. In other words, the update may involve removing the ES indicated in the route withdrawal advertisement from pointing to the shared ECMP group and further causing the ES to point to a new ECMP group. The new ECMP group may include a set of network devices that would remain if the network device that transmitted the route withdrawal advertisement were to be removed from the two or more network devices in the shared ECMP group. In many further embodiments, the process 700 may distribute the updated next hop list across the network devices to ensure that all traffic follows the correct routes.

Although a specific embodiment for routing based on route withdrawal advertisements suitable for carrying out the various steps, processes, methods, and operations described herein is discussed with respect to FIG. 7, any of a variety of systems and/or processes may be utilized in accordance with embodiments of the disclosure. For example, updating the next hop list can be due to a route addition advertisement when a new route may be advertised by a network device that is not the part of the shared ECMP group, but the route addition advertisement makes the network device eligible for inclusion in the shared ECMP group. The elements depicted in FIG. 7 may also be interchangeable with other elements of FIGS. 1-6, 8, and 9 as required to realize a particularly desired embodiment.

Figure 8:
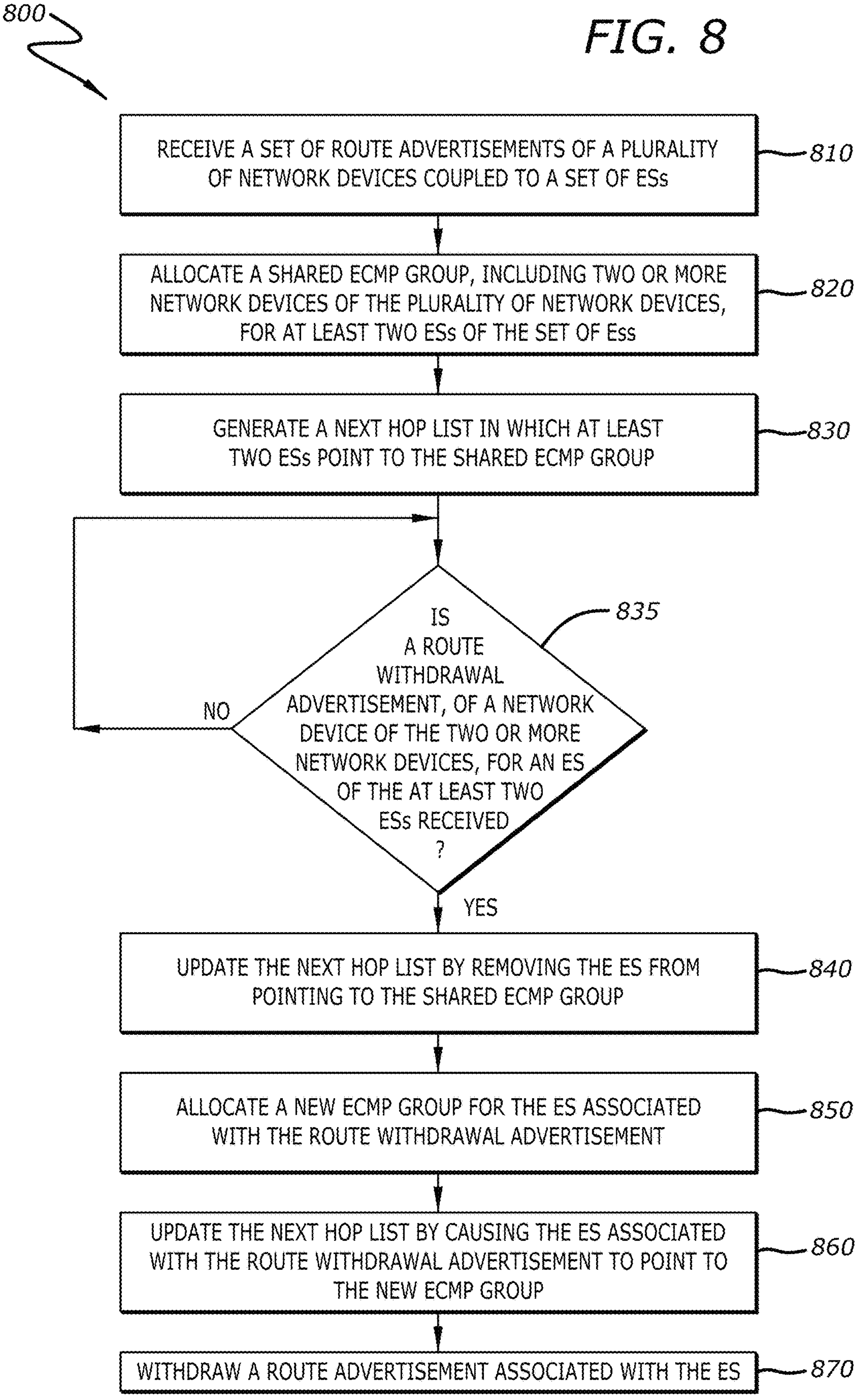
FIG. 8 is a flowchart showing a process for optimized ECMP group allocation in a multi-homing network in accordance with various embodiments of the disclosure.

Referring to FIG. 8, a flowchart showing a process 800 for optimized ECMP group allocation in a multi-homing network in accordance with various embodiments of the disclosure is shown. In many embodiments, the process 800 may receive a set of route advertisements of a plurality of network devices coupled to a set of ESs (block 810). For example, a multi-homing network (e.g., an EVPN network) may include multiple servers (e.g., host devices) connected to a group of routers (e.g., the plurality of network devices) through different ESs. Thus, ensuring if one path fails, there are alternative paths for data to travel. Each of the plurality of network devices (e.g., plurality of PE devices, a plurality of transmitting PE devices, a plurality of transmitting network nodes, or the like) may transmit route advertisement(s) for advertising corresponding route prefixes and related routing information. For example, a route advertisement transmitted by a network device may include an ESI of one of the sets of ESs coupled to the network device, an IP address of the network device, a route prefix, a weight attribute associated with the ES, and associated VLAN information. In an example scenario, PE1 may advertise EAD routes for ES1 and ES2, PE2 may advertise EAD routes for ES1, ES2, and ES3, and PE3 may advertise EAD routes for ES1, ES2, and ES3.

In a variety of embodiments, the process 800 may allocate a shared ECMP group, including two or more network devices, for at least two ESs of the set of ESs (block 820). The process 800 may analyze the set of route advertisements for an intersection of ESIs and/or weight attributes. In other words, the process 800 may determine whether ESs are shared or are common between the two or more network devices. The objective of allocating the shared ECMP group is to eliminate redundancy in ECMP group allocation. Continuing the above example, the process 800 may identify that PE1, PE2, and PE3 have advertised routes for ES1 and ES2. Thus, the process 800 may allocate a shared ECMP group including PE1, PE2, and PE3 for ES1 and ES2. In other words, the shared ECMP group may include the two or more network devices, of the plurality of network devices, that have the at least two ESs in common. Further, the process 800 may further identify that PE2 and PE3 have additionally advertised routes for ES3. Thus, the process 800 may allocate a non-shared ECMP group including PE2 and PE3 for ES3.

In a number of embodiments, the process 800 may generate a next hop list in which the at least two ESs point to the shared ECMP group (block 830). In other words, the shared ECMP group is allocated prior to generating the next hop list. Thus, after the shared and non-shared ECMP groups are allocated for the set of ESs, the next hop list may be generated. The next hop list may serve as a routing table that outlines the possible paths that data packets can take as they traverse the network. In the next hop list, the at least two ESs may point to the shared ECMP group while other ESs may point to corresponding non-shared ECMP groups. Continuing the above example, in the next hop list, ES1 and ES2 may point to the shared ECMP group including PE1, PE2, and PE3, while ES3 may point to the non-shared ECMP group including PE2 and PE3.

In still more embodiments, the process 800 may determine whether a route withdrawal advertisement, of a network device of the two or more network devices, for an ES of the at least two ESs is received (block 835). Specifically, the process 800 may continuously monitor for any route withdrawal advertisements. The route advertisements may indicate that a particular network device may no longer available for routing traffic through a specific ES. If no route withdrawal advertisement is received, the process 800 may loop back, continuing to monitor for such an event (block 835).

Upon receiving a route withdrawal advertisement from a network device included in the shared ECMP group, in further embodiments, the process 800 may update the next hop list by removing the ES from pointing to the shared ECMP group (block 840). In other words, the process 800 may remove the ES, affected by the route withdrawal advertisement, from pointing to the shared ECMP group. For example, a route withdrawal advertisement for ES2 may be received from PE2. In such a scenario, the process 800 may remove ES2 from pointing to the shared ECMP group that included PE1, PE2, and PE3, and may enable fast re-route. However, ES1 may continue pointing to the shared ECMP group that includes PE1, PE2, and PE3.

In yet more embodiments, the process 800 may allocate a new ECMP group for the ES associated with the route withdrawal advertisement (block 850). In other words, following the update of the next hop list, the process 800 may allocate the new ECMP group for the ES that was associated with the route withdrawal advertisement. The new ECMP group may ensure that traffic can still be routed through other available paths associated with the affected ES, maintaining network redundancy and efficiency. Continuing the above example, the process 800 may generate a new ECMP group including PE1 and PE3 for ES2.

In numerous embodiments, the process 800 may update the next hop list by causing the ES associated with the route withdrawal advertisement to point to the new ECMP group (block 860). The new ECMP group may include a set of network devices that would remain after removing the network device associated with the route withdrawal advertisement from the two or more PE devices in the shared ECMP group. Continuing the above example, the process 800 may cause ES2 to point to the new ECMP group including PE1 and PE3. This ensures that any data meant for ES2 will still be routed effectively (e.g., fast re-routed), despite the failure of PE2. The updated next hop list is then distributed across the network devices to ensure that all traffic follows the correct routes.

In numerous additional embodiments, the process 800 may withdraw a route advertisement associated with the ES (block 870). The process 800 may finalize rerouting of traffic and ensure that the network no longer considers the withdrawn path as a viable option for routing data. For example, the process 800 may withdraw any route advertisements associated with ES2 and PE2.

Although a specific embodiment for optimized ECMP group allocation in a multi-homing network suitable for carrying out the various steps, processes, methods, and operations described herein is discussed with respect to FIG. 8, any of a variety of systems and/or processes may be utilized in accordance with embodiments of the disclosure. For example, the routing may not be limited to any specific EVPN architecture but can be implemented in MPLS, VXLAN, Segment Routing, or other network architectures. The elements depicted in FIG. 8 may also be interchangeable with other elements of FIGS. 1-7 and 9 as required to realize a particularly desired embodiment.

Figure 9:
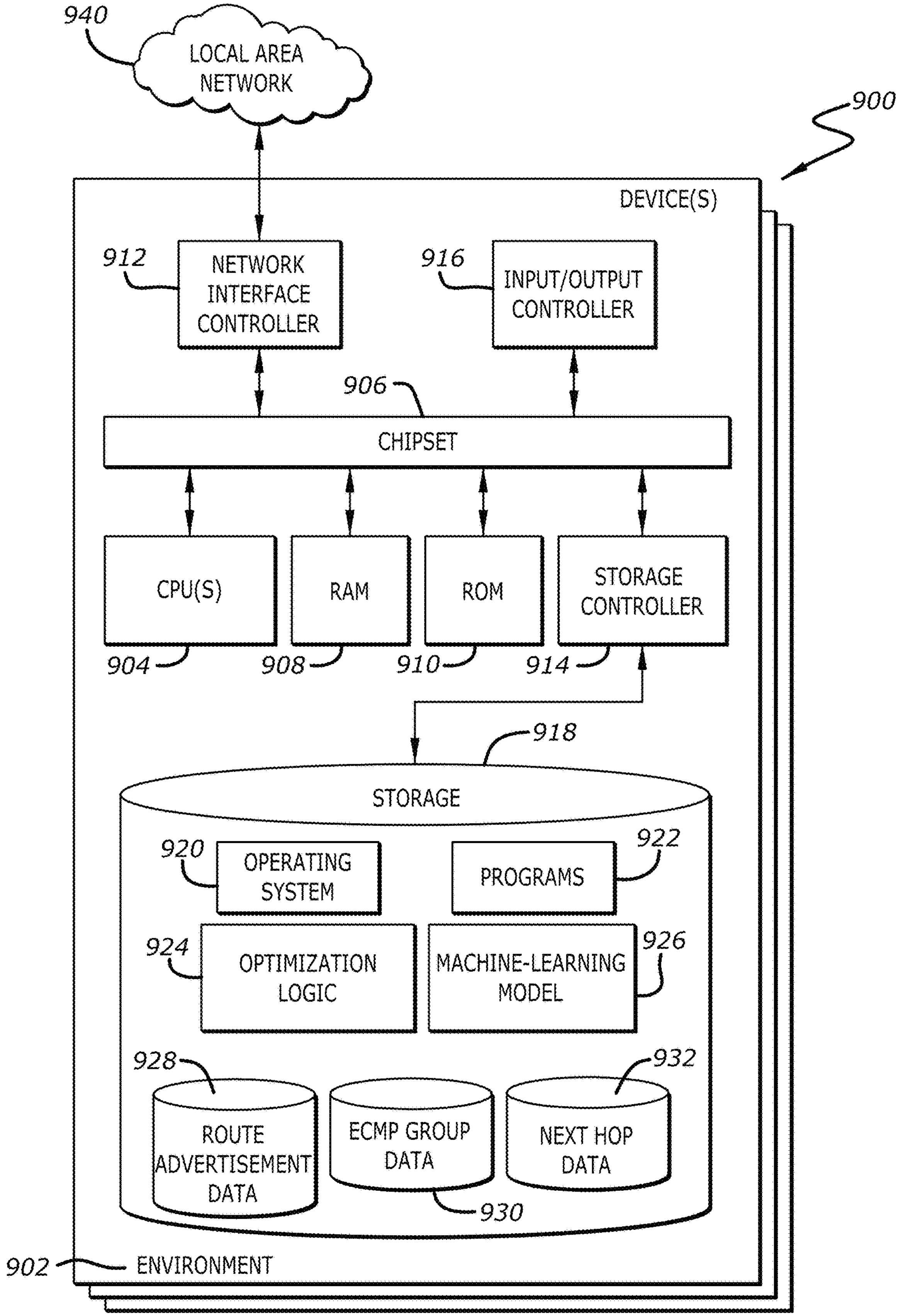
FIG. 9 is a conceptual block diagram of a device suitable for configuration with an optimization logic in accordance with various embodiments of the disclosure.

Referring to FIG. 9, a conceptual block diagram of a device 900 suitable for configuration with an assisted roaming logic, in accordance with various embodiments of the disclosure is shown. The embodiment of the conceptual block diagram depicted in FIG. 9 can illustrate a conventional server, switch, wireless LAN controller, access point, computer, workstation, desktop computer, laptop, tablet, network appliance, e-reader, smartphone, or other computing device, and can be utilized to execute any of the application and/or logic components presented herein. The embodiment of the conceptual block diagram depicted in FIG. 9 can also illustrate an access point, a switch, or a router in accordance with various embodiments of the disclosure. The device 900 may, in many non-limiting examples, correspond to physical devices or to virtual resources described herein.

In many embodiments, the device 900 may include an environment 902 such as a baseboard or "motherboard," in physical embodiments that can be configured as a printed circuit board with a multitude of components or devices connected by way of a system bus or other electrical communication paths. Conceptually, in virtualized embodiments, the environment 902 may be a virtual environment that encompasses and executes the remaining components and resources of the device 900. In more embodiments, one or more processors 904, such as, but not limited to, central processing units ("CPUs") can be configured to operate in conjunction with a chipset 906. The processor(s) 904 can be standard programmable CPUs that perform arithmetic and logical operations necessary for the operation of the device 900.

In a number of embodiments, the processor(s) 904 can perform one or more operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

In various embodiments, the chipset 906 may provide an interface between the processor(s) 904 and the remainder of the components and devices within the environment 902. The chipset 906 can provide an interface to a random-access memory ("RAM") 908, which can be used as the main memory in the device 900 in some embodiments. The chipset 906 can further be configured to provide an interface to a computer-readable storage medium such as a read-only memory ("ROM") 910 or non-volatile RAM ("NVRAM") for storing basic routines that can help with various tasks such as, but not limited to, starting up the device 900 and/or transferring information between the various components and devices. The ROM 910 or NVRAM can also store other application components necessary for the operation of the device 900 in accordance with various embodiments described herein.

Additional embodiments of the device 900 can be configured to operate in a networked environment using logical connections to remote computing devices and computer systems through a network, such as the network 940. The chipset 906 can include functionality for providing network connectivity through a network interface card ("NIC") 912, which may comprise a gigabit Ethernet adapter or similar component. The NIC 912 can be capable of connecting the device 900 to other devices over the network 940. It is contemplated that multiple NICs 912 may be present in the device 900, connecting the device to other types of networks and remote systems.

In further embodiments, the device 900 can be connected to a storage 918 that provides non-volatile storage for data accessible by the device 900. The storage 918 can, for instance, store an operating system 920, applications 922 (denoted as "programs" in FIG. 9). The storage 918 can be connected to the environment 902 through a storage controller 914 connected to the chipset 906. In certain embodiments, the storage 918 can consist of one or more physical storage units. The storage controller 914 can interface with the physical storage units through a serial attached SCSI ("SAS") interface, a serial advanced technology attachment ("SATA") interface, a fiber channel ("FC") interface, or other type of interface for physically connecting and transferring data between devices and physical storage units.

The device 900 can store data within the storage 918 by transforming the physical state of the physical storage units to reflect the information being stored. The specific transformation of physical state can depend on various factors. Examples of such factors can include, but are not limited to, the technology used to implement the physical storage units, whether the storage 918 is characterized as primary or secondary storage, and the like.

In many more embodiments, the device 900 can store information within the storage 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit, or the like. Other transformations of physical media are possible without departing from the scope and spirit of the present description, with the foregoing examples provided only to facilitate this description. The device 900 can further read or access information from the storage 918 by detecting the physical states or characteristics of one or more particular locations within the physical storage units.

In addition to the storage 918 described above, the device 900 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 900. In some examples, the operations performed by a cloud computing network, and or any components included therein, may be supported by one or more devices similar to device 900. Stated otherwise, some or all of the operations performed by the cloud computing network, and or any components included therein, may be performed by one or more devices 900 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage 918 can store an operating system 920 utilized to control the operation of the device 900. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage 918 can store other system or application programs and data utilized by the device 900.

In many additional embodiments, the storage 918 or other computer-readable storage media is encoded with computer-executable instructions which, when loaded into the device 900, may transform it from a general-purpose computing system into a special-purpose computer capable of implementing the embodiments described herein. These computer-executable instructions may be stored as application 922 and transform the device 900 by specifying how the processor(s) 904 can transition between states, as described above. In some embodiments, the device 900 has access to computer-readable storage media storing computer-executable instructions which, when executed by the device 900, perform the various processes described above with regard to FIGS. 1-8. In certain embodiments, the device 900 can also include computer-readable storage media having instructions stored thereupon for performing any of the other computer-implemented operations described herein.

In many further embodiments, the device 900 may include an optimization logic 924. The optimization logic 924 can be configured to perform one or more of the various steps, processes, operations, and/or other methods that are described above. Often, the optimization logic 924 can be a set of instructions stored within a non-volatile memory that, when executed by the processor(s) 904 can carry out these steps, etc. In some embodiments, the optimization logic 924 may be a client application that resides on a network-connected device, such as, but not limited to, a server, switch, personal or mobile computing device in a single or distributed arrangement.

In numerous embodiments, the optimization logic 924 may be configured to receive a set of route advertisements of a plurality of network devices (e.g., transmitting PE devices) in a multi-homing network. In an example, the device 900 may be a remote PE device. The optimization logic 924 may allocate a shared ECMP group that may include two or more transmitting PE devices of the plurality of PE devices, for at least two ESs of a set of ESs associated with the plurality of transmitting PE devices based on the set of route advertisements. The allocation of the shared ECMP group may be based on an intersection of ESIs and weight attributes of the at least two ESs in route advertisements of the two or more transmitting PE devices. Further, the optimization logic 924 may generate a next hop list in which the at least two ESs point to the shared ECMP group. However, if there is no intersection of ESIs and weight attributes of an ES, the ES is allocated a separate ECMP group.

In numerous additional embodiments, the optimization logic 924 may be configured to receive a route withdrawal advertisement of a PE device for an ES of the at least two ESs. The route withdrawal advertisement may be received due to any link failure associated with the ES. The optimization logic 924 may be configured to update the next hop list by removing the ES from pointing to the shared ECMP group. The optimization logic 924 may be further configured to allocate a new ECMP group that may include a set of PE devices that remain after removing the PE device that had advertised the route withdrawal advertisement from the shared ECMP group.

In various embodiments, the route advertisement data 928 may refer to information shared by network devices within a network to communicate the available routes or paths for data transmission. The route advertisement data 928 can comprise route advertisements (e.g., EVPN Route-Types 1, 2, and 5) transmitted in a BGP control plane. The Route-Type 1 may be associated with EAD route that facilitates the discovery of EVPN instances and segments. The Route-Type 2 may be associated with the MAC/IP advertisement route that advertises MAC addresses and optionally IP addresses, supporting host mobility and Layer 2/3 reachability within the EVPN domain. The Route-Type 5 may be associated with the IP Prefix route that disseminates IP prefixes, enabling Layer 3 VPN services over EVPN by integrating IP routing information into the EVPN fabric. Additionally, the route advertisements may include weight attribute indicating a total link count associated with corresponding ESI.

In numerous additional embodiments, the ECMP group data 930 may comprise information used to manage and distribute network traffic across multiple paths that have the same cost or distance to a destination. The ECMP group data 930 may include details various ECMP groups, shared or non-shared, allocated by the optimization logic 924. For example, the ECMP group data 930 may indicate unique identifiers of PE devices included in each ECMP group.

In a number of embodiments, the next hop data 932 may include information regarding next hops identified by the optimization logic 924 for each route prefix. The next hop data 932 can be utilized by the optimization logic 924 to determine the optimized ECMP groups for data transmission. Further, the next hop data 932 may include a next hop table indicating a mapping between advertised route prefixes and their potential next hops. An ES listed in the next hop table against a route prefix may be configured to point to a corresponding shared or non-shared ECMP group allocated by the optimization logic 924.

In still further embodiments, the device 900 can also include one or more input/output controllers 916 for receiving and processing input from a number of input devices, such as a keyboard, a mouse, a touchpad, a touch screen, an electronic stylus, or other type of input device. Similarly, an input/output controller 916 can be configured to provide output to a display, such as a device monitor, a flat panel display, a digital projector, a printer, or other type of output device. Those skilled in the art will recognize that the device 900 might not include all of the components shown in FIG. 9 and can include other components that are not explicitly shown in FIG. 9 or might utilize an architecture completely different than that shown in FIG. 9.

As described above, the device 900 may support a virtualization layer, such as one or more virtual resources executing on the device 900. In some examples, the virtualization layer may be supported by a hypervisor that provides one or more virtual machines running on the device 900 to perform functions described herein. The virtualization layer may generally support a virtual resource that performs at least a portion of the techniques described herein.

Finally, in numerous additional embodiments, data may be processed into a format usable by a machine-learning model 926 (e.g., feature vectors), and or other pre-processing techniques. The machine-learning ("ML") model 926 may be any type of ML model, such as supervised models, reinforcement models, and/or unsupervised models. The ML model 926 may include one or more of linear regression models, logistic regression models, decision trees, Naïve Bayes models, neural networks, k-means cluster models, random forest models, and/or other types of ML models 926. The ML model 926 may be configured to learn about the route advertisement data 928, the ECMP group data 930, and the next hop data 932 to figure out the optimized ECMP groups for delivering data packets across various network nodes in a data center. In numerous embodiments, the ML model 926 may be configured to learn context information associated with different ESs utilized in an EVPN instance in a multi-homing network based on the route advertisement data 928 and allocate further optimized shared ECMP groups based on the context information, in addition to the intersection of the ESIs between PE devices in the multi-homing network. Optimization of the shared ECMP groups using the ML model 926 can include further aggregation or de-aggregation shared ECMP groups created based on optimization using link-count intersection or ES intersection.

The ML model(s) 926 can be configured to generate inferences to make predictions or draw conclusions from data. An inference can be considered the output of a process of applying a model to new data. This can occur by learning from at least the identifier data 928, the route prefix data 930, and the next hop data 932. These predictions are based on patterns and relationships discovered within the data. To generate an inference, the trained model can take input data and produce a prediction or a decision. The input data can be in various forms, such as images, audio, text, or numerical data, depending on the type of problem the model was trained to solve. The output of the model can also vary depending on the problem, and can be a single number, a probability distribution, a set of labels, a decision about an action to take, etc. Ground truth for the ML model(s) 926 may be generated by human/administrator verifications or may compare predicted outcomes with actual outcomes.

Although a specific embodiment for a device suitable for configuration with the assisted roaming logic for carrying out the various steps, processes, methods, and operations described herein is discussed with respect to FIG. 9, any of a variety of systems and/or processes may be utilized in accordance with embodiments of the disclosure. For example, the device 900 may be in a virtual environment such as a cloud-based network administration suite, or it may be distributed across a variety of network devices or APs. The elements depicted in FIG. 9 may also be interchangeable with other elements of FIGS. 1-8 as required to realize a particularly desired embodiment.

Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced other than specifically described without departing from the scope and spirit of the present disclosure. Thus, embodiments of the present disclosure should be considered in all respects as illustrative and not restrictive. It will be evident to the person skilled in the art to freely combine several or all of the embodiments discussed here as deemed suitable for a specific application of the disclosure. Throughout this disclosure, terms like "advantageous", "exemplary" or "example" indicate elements or dimensions which are particularly suitable (but not essential) to the disclosure or an embodiment thereof and may be modified wherever deemed suitable by the skilled person, except where expressly required. Accordingly, the scope of the disclosure should be determined not by the embodiments illustrated, but by the appended claims and their equivalents.

Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, workpiece, and fabrication material detail can be made, without departing from the spirit and scope of the present disclosure, as set forth in the appended claims, as might be apparent to those of ordinary skill in the art, are also encompassed by the present disclosure.

What is claimed is:

1. A device, comprising:
a processor;
a network interface controller configured to provide access to a network comprising a plurality of network devices, wherein each of the plurality of network devices is coupled to a set of Ethernet Segments (ESs); and
a memory communicatively coupled to the processor, wherein the memory comprises an optimization logic that is configured to:
receive a set of route advertisements of the plurality of network devices;
allocate a shared Equal Cost Multi-Path (ECMP) group, including two or more network devices of the plurality of network devices, for at least two ESs of the set of ESs based on the set of route advertisements; and
generate a next hop list in which the at least two ESs point to the shared ECMP group.

2. The device of claim 1, wherein a route advertisement of a network device of the plurality of network devices is configured to advertise an Ethernet Segment Identifier (ESI) of an ES of the set of ESs coupled to the network device.

3. The device of claim 2, wherein the optimization logic is further configured to allocate the shared ECMP group based on an intersection of ESIs of the at least two ESs in route advertisements of the two or more network devices.

4. The device of claim 1, wherein a route advertisement of a network device of the plurality of network devices is configured to advertise an Ethernet Segment Identifier (ESI) and a weight attribute, of an ES of the set of ESs coupled to the network device.

5. The device of claim 4, wherein the optimization logic is further configured to allocate the shared ECMP group based on an intersection of ESIs and weight attributes of the at least two ESs in route advertisements of the two or more network devices.

6. The device of claim 4, wherein the weight attribute of the ES is configured to indicate a total link count associated with the ES.

7. The device of claim 1, wherein the optimization logic is further configured to:

detect a link failure associated with at least one network device of the two or more network devices; and update the shared ECMP group based on the detected link failure.

8. The device of claim 1, wherein the optimization logic is further configured to:

receive a route withdrawal advertisement, of a network device of the two or more network devices, for an ES of the at least two ESs; and update the next hop list based on the route withdrawal advertisement.

9. The device of claim 1, wherein the set of route advertisements corresponds to Ethernet Virtual Private Network (EVPN) route advertisements.

10. The device of claim 9, wherein the set of route advertisements corresponds to Ethernet Auto-Discovery (EAD) route advertisements.

11. The device of claim 1, wherein the plurality of network devices corresponds to provider edge (PE) devices coupled to two or more host devices via the set of ESs.

12. The device of claim 11, wherein the two or more host devices are Media Access Control (MAC)-addressable devices.

13. The device of claim 1, wherein the device corresponds to a remote provider edge device.

14. A method, comprising:

receiving a set of route advertisements of a plurality of network devices, wherein each of the plurality of network devices is coupled to a set of ethernet segments (ESs);

allocating a shared Equal Cost Multi-Path (ECMP) group, including two or more network devices of the plurality of network devices, for at least two ESs of the set of ESs based on the set of route advertisements; and generating a next hop list in which the at least two ESs point to the shared ECMP group.

15. The method of claim 14, wherein a route advertisement of a network device of the plurality of network devices is configured to advertise an Ethernet Segment Identifier (ESI) of an ES of the set of ESs coupled to the network device.

16. The method of claim 15, further comprising allocating the shared ECMP group based on an intersection of ESIs of the at least two ESs in route advertisements of the two or more network devices.

17. The method of claim 14, wherein a route advertisement of a network device of the plurality of network devices is configured to advertise an Ethernet Segment Identifier (ESI) and a weight attribute, of an ES of the set of ESs coupled to the network device.

18. The method of claim 17, further comprising allocating the shared ECMP group based on an intersection of ESIs and weight attributes of the at least two ESs in route advertisements of the two or more network devices.

19. The method of claim 17, wherein the weight attribute of the ES is configured to indicate a total link count associated with the ES.

20. The method of claim 14, further comprising:

detecting a link failure associated with at least one network device of the two or more network devices; and updating the shared ECMP group based on the detected link failure.

21. The method of claim 14, further comprising:

receiving a route withdrawal advertisement, of a network device of the two or more network devices, for an ES of the at least two ESs; and updating the next hop list based on the route withdrawal advertisement.

22. The method of claim 14, wherein the set of route advertisements corresponds to Ethernet Virtual Private Network (EVPN) route advertisements.

23. The method of claim 22, wherein the set of route advertisements corresponds to Ethernet Auto-Discovery (EAD) route advertisements.

24. The method of claim 14, wherein the plurality of network devices corresponds to provider edge (PE) devices coupled to two or more host devices via the set of ESs.

25. The method of claim 14, wherein the two or more host devices are Media Access Control (MAC)-addressable devices.

26. The method of claim 14, wherein the device corresponds to a remote provider edge device.

* * * * *